US012725097B2

(12) United States Patent
Choi et al.

(10) Patent No.: US 12,725,097 B2
(45) Date of Patent: Sep. 1, 2026

(54) SEAT LIBRARY PAIRING METHOD AND SYSTEM USING SHORT-DISTANCE WIRELESS COMMUNICATION

(71) Applicant: HYBE Co., Ltd., Seoul (KR)

(72) Inventors: Bo Yoon Choi, Seoul (KR); Sung Joo Jeong, Seoul (KR); Hyeong Gu Kim, Seoul (KR); Da Hye Seo, Seoul (KR)

(73) Assignee: HYBE Co., Ltd., Seoul (KR)

( * ) Notice: Subject to any disclaimer, the term of this patent is extended or adjusted under 35 U.S.C. 154(b) by 0 days.

(21) Appl. No.: 18/344,658

(22) Filed: Jun. 29, 2023

(65) Prior Publication Data

US 2024/0005220 A1 Jan. 4, 2024

(30) Foreign Application Priority Data

Jul. 4, 2022 (KR) ........................ 10-2022-0081737

(51) Int. Cl.
*G06Q 10/02* (2012.01)

(52) U.S. Cl.
CPC .................................... *G06Q 10/02* (2013.01)

(58) Field of Classification Search
CPC ........ G06Q 10/02; G06Q 50/10; G06Q 20/18; G06Q 20/40; A63H 2200/00; A63H 33/22; A63H 33/26; A63H 37/00; H04W 4/02; H04W 4/33; H04W 4/80; H04W 4/025; H04W 4/029; H04W 4/30; A63J 5/02; G06K 19/0723; G06V 30/20; G07F 17/40; H05B 47/105; H05B 47/19
See application file for complete search history.

(56) References Cited

U.S. PATENT DOCUMENTS 10,893,597 B2 1/2021 Choi et al.
11,064,127 B2 7/2021 Song et al.
11,297,253 B2 4/2022 Song et al.
11,452,192 B2 9/2022 Kwon et al.
(Continued)

FOREIGN PATENT DOCUMENTS

JP 2005-71081 3/2005
JP 2021-508147 2/2021
(Continued)

OTHER PUBLICATIONS

Be Marie Korea "The Best Kpop Lightsticks | A Full Guide to All Kpop Lightsticks + Where to Buy Kpop Lightsticks" Updated Feb. 3, 2022 (available at: https://web.archive.org/web/20220628071244/https://bemariekorea.com/kpop-lightsticks/) (Year: 2022).*

*Primary Examiner* — Rupangini Singh
*Assistant Examiner* — Stephanie S. Wallick
(74) *Attorney, Agent, or Firm* — STIP Law Group, LLC

(57) ABSTRACT

A seat library pairing method using short-distance wireless communication according to an embodiment of the present invention is a method performed by an application executed by at least one processor of a kiosk, and comprises detecting ticket reservation information, extracting seat information including a position of a seat at a performance hall from the detected ticket reservation information, determining a seat library corresponding to the extracted seat information, pairing the kiosk and a cheering light stick to store the determined seat library, and transmitting the seat library to the paired cheering light stick.

11 Claims, 14 Drawing Sheets

(56) References Cited

U.S. PATENT DOCUMENTS

| | | | | |
|---|---|---|---|---|
| 11,638,338 | B2 | 4/2023 | Choi et al. | |
| 11,647,297 | B2 | 5/2023 | Song et al. | |
| 11,678,423 | B2 | 6/2023 | Kwon et al. | |
| 12,120,799 | B2 | 10/2024 | Choi | |
| 2010/0070312 | A1* | 3/2010 | Hunt | G06Q 50/265 235/494 |
| 2012/0184209 | A1* | 7/2012 | Wengrovitz | H04L 67/12 709/224 |
| 2015/0004903 | A1* | 1/2015 | Lyman | H04W 4/80 455/41.1 |
| 2017/0135165 | A1* | 5/2017 | Lu | H05B 45/20 |
| 2017/0206474 | A1* | 7/2017 | McDonald | G07B 15/00 |
| 2017/0249489 | A1* | 8/2017 | Lee | H04W 4/80 |
| 2018/0049287 | A1* | 2/2018 | Lu | H05B 47/155 |
| 2019/0394860 | A1* | 12/2019 | Choi | H05B 47/155 |
| 2020/0084360 | A1* | 3/2020 | Song | H04M 1/72409 |
| 2021/0076471 | A1* | 3/2021 | Kwon | G09G 3/2074 |
| 2021/0076472 | A1* | 3/2021 | Kim | H05B 47/16 |
| 2021/0084737 | A1 | 3/2021 | Choi et al. | |
| 2021/0136272 | A1 | 5/2021 | Song et al. | |
| 2022/0191375 | A1 | 6/2022 | Song et al. | |
| 2022/0210897 | A1* | 6/2022 | Wang | G01S 5/10 |
| 2022/0264733 | A1* | 8/2022 | Choi | H05B 47/165 |
| 2022/0386437 | A1 | 12/2022 | Kwon et al. | |
| 2023/0117158 | A1 | 4/2023 | Choi | |
| 2023/0209674 | A1 | 6/2023 | Choi et al. | |

FOREIGN PATENT DOCUMENTS

| | | | | |
|---|---|---|---|---|
| JP | 2021-61250 | | 4/2021 | |
| JP | 2021-64613 | | 4/2021 | |
| KR | 10-2015-0136023 | | 12/2015 | |
| KR | 10-1730301 | | 4/2017 | |
| KR | 101730301 | B1 * | 4/2017 | |
| KR | 10-2018-0015701 | | 2/2018 | |
| KR | 10-2018-0015702 | | 2/2018 | |
| KR | 10-2018-0015703 | | 2/2018 | |
| KR | 10-1862689 | | 5/2018 | |
| KR | 10-1942809 | | 1/2019 | |
| KR | 10-2020-0071711 | | 6/2020 | |
| KR | 20200121570 | A * | 10/2020 | A63H 5/00 |
| KR | 10-2021-0136814 | | 11/2021 | |
| KR | 10-2336353 | | 12/2021 | |
| KR | 102336353 | B1 * | 12/2021 | H04L 69/14 |
| WO | 2021/210938 | | 10/2021 | |

* cited by examiner

| | Identification Nos. | Light emitting pattern | | | |
|---|---|---|---|---|---|
| | | Light emission | Color | Brightness | Light emission effect |
| 1010 | 1 | ON | (255,0,0) | 50 | Blink |
| 1020 | 2 | OFF | - | - | - |
| 1030 | 3 | ON | (0,0,255) | 10 | Grad |

| | Identification Nos. | Library identification Nos. | Duration |
|---|---|---|---|
| 1100 | 001 | 0001 | 5sec |
| | | 0002 | 3sec |
| | | 0003 | 2sec |
| 1200 | 002 | 0005 | 8sec |
| | | 0001 | 30sec |
| | | 0004 | 14sec |

SEAT LIBRARY PAIRING METHOD AND SYSTEM USING SHORT-DISTANCE WIRELESS COMMUNICATION

CROSS-REFERENCE TO RELATED APPLICATIONS

This application claims priority under 35 U.S.C. 119(a) to Korean Patent Application No. 10-2022-0081737, filed on Jul. 4, 2022, in the Korean Intellectual Property Office, the entire disclosure of which is incorporated herein by reference for all purposes.

TECHNICAL FIELD

The present invention relates to a seat library pairing method and system using short-distance wireless communication. More particularly, the present invention relates to a seat library pairing method and system using short-distance wireless communication and a cheering light stick equipped with a light emitting function.

BACKGROUND

In general, a light stick refers to a stick-shaped object that obtains a lighting effect by applying a fluorescent material or by separately providing a battery.

Light sticks are used for nighttime activities, mountain climbing, various events, and cheering. In particular, since the light sticks may be produced to display various colors, they are used as a cheering tool for audiences in the dark indoors of various performance halls including concert halls. The light sticks are also used as one of the performance directing tool to make a singer's name or to create a specific shape by using the light sticks possessed by a large number of audiences.

According to the related art, for example as described in Korean Patent Application Number 10-2015-0136023, in order to direct a performance using a light stick, each user may download in advance a library in which the light emission of the light stick is preset according to the signature color or song rhythm of the cheering team or artist and may apply the library to the cheering light stick.

However, when a user did not download the library in advance due to lack of time or unfamiliarity with a manipulation to download the library, she/he could not participate in the overall controlled performance direction and had to endure inconveniences of manually manipulating the cheering light stick.

In addition, in order for a user to download the library in advance, the user has to download a pairing application in advance and conducting a pairing step between the pairing application and the light stick separately. Therefore, the more performances the user wants to watch, the longer time is required for the pairing step, which is cumbersome and inconvenient for the user.

In addition, when each user watches several performances several times and downloads a plurality of libraries, the storage capacity for the library in the cheering light stick becomes easily excessive, and the probability of an glitch of the light stick will increase.

SUMMARY

The present invention has been devised to solve the problem described above. An aspect of the present invention is directed to providing a seat library pairing method and system using short-distance wireless communication.

In addition, an aspect of the present invention is directed to providing a pairing method and system for storing a seat library on a cheering light stick by way of using short-distance wireless communication in advance of a performance in order to integrate and direct the performance of a plurality of cheering light sticks.

In addition, an aspect of the present invention is directed to providing a seat library pairing method and system using short-distance wireless communication having an intuitive user experience.

A seat library pairing method using short-distance wireless communication according to an embodiment of the present invention is performed by a processor of a kiosk and comprises detecting ticket reservation information, extracting seat information including a position of a seat at a performance hall from the detected ticket reservation information, determining a seat library corresponding to the extracted seat information, pairing the kiosk with a cheering light stick to store the determined seat library, and transmitting the seat library to the paired cheering light stick.

The user account information includes at least one or more information about a user's name, a date of birth, a mobile phone number, an e-mail address, and a platform ID, and the ticket reservation information includes at least one information about a name of a person who purchased a ticket, a date of birth, a ticket website ID, a mobile phone number, a performance name, a performance date and time, a performance place, a reservation number, a number of tickets reserved, and seat information.

In addition, the detecting the ticket reservation information comprises acquiring a ticket image by capturing a ticket through an image sensor, performing optical character recognition (OCR) on the acquired ticket image, and extracting a predetermined text included in the acquired ticket image.

In addition, the detecting the ticket reservation information comprises acquiring user account information from an account authentication device, and detecting the ticket reservation information matching the acquired user account information.

In addition, the acquiring the user account information from the account authentication device further comprises recognizing the account authentication device tagged to an NFC account tag module, and reading the user account information through NFC communication from the recognized account authentication device.

In addition, the detecting the ticket reservation information corresponding to the acquired user account information comprises communicating with a performance management server, selecting ticket reservation information corresponding to the acquired user account information among at least one or more ticket reservation information stored on a database of the performance management server; and receiving the detected ticket reservation information for the acquired user account information from the performance management server.

In addition, the extracting the seat information included in the detected ticket reservation information further comprise, when a plurality of ticket reservation information is detected, determining one ticket reservation information selected by a user, and extracting seat information for the determined ticket reservation information.

In addition, the determining the seat library according to the extracted seat information comprises storing a plurality of seat libraries corresponding to performance preparation data for each seat information, comparing the extracted seat information with the seat information of the plurality of seat libraries, and detecting and determining a seat library corresponding to the extracted seat information among the plurality of seat libraries.

In addition, the performance preparation data comprises at least one of light emitting pattern, library data, and a scenario.

In addition, the library data comprises an identification code for identifying each library and a light emitting pattern set value that is a preset value for constituents of the light emitting pattern, and the scenario comprises an identification code for identifying each scenario and a library set value that is a preset value for an operation time of the library data.

In addition, in the plurality of seat libraries, the identification code for identifying the library and the identification code for identifying the scenario are the same, and the light emitting pattern set value and the library set value are defined differently for each seat information.

In addition, the pairing the kiosk with the cheering light stick to store the seat library comprises performing short-distance communication between the kiosk and the cheering light stick adjacent to the cheering light stick pairing module through Bluetooth communication.

In addition, the detecting the ticket reservation information corresponding to the acquired user account information further comprises detecting the ticket reservation information corresponding to the acquired user account information among at least one or more ticket reservation information stored on a memory of the kiosk, and reading the detected ticket reservation information from the memory of the kiosk, wherein the kiosk operates both in online for communication with the performance management server and in offline for reading information stored on the memory of the kiosk.

In a seat library pairing system using short-distance wireless communication according to an embodiment of the present invention, a kiosk comprises at least one display for displaying a content of a library pairing service, at least one memory, and at least one processor, and at least one application stored in the memory of the kiosk and executed by the processor to provide the library pairing service providing detecting ticket reservation information, extracting seat information including a position of a seat at a performance hall from the detected ticket reservation information, determining a seat library corresponding to the extracted seat information, pairing the kiosk with a cheering light stick to store the determined seat library, and transmitting the seat library to the paired cheering light stick.

In addition, a seat library pairing system using short-distance wireless communication comprises a cheering light stick that emits light according to a predetermined data, an account authentication device including personal information of a user who wants to use the cheering light stick, a user terminal including a display, a memory and a processor, and at least one application stored in the memory of the user terminal and executed by the processor to provide a library pairing service which provides registering at least one account authentication device, selecting the account authentication device to be activated, registering a cheering light stick to be used during a performance, and transmitting a seat library to the registered cheering light stick.

In addition, the predetermined data comprises a light emitting pattern pre-stored in the cheering light stick and the transmitted seat library, and the user terminal is capable of manually controlling the cheering light stick whether to emit light according to the pre-stored light emitting pattern, or whether to change at least one of color, brightness, and light emission effect of the cheering light stick.

In addition, the kiosk is implemented either as one of an integrated type in which an account tag module and a cheering light stick pairing module are installed in a housing, or as a detachable type in which the account tag module and the cheering light stick pairing module are separated from the housing and are installed individually.

The seat library pairing method and system using short-distance wireless communication according to an embodiment of the present invention has the benefit that a plurality of cheering light sticks can be controlled through a seat library stored in advance so that the plurality of cheering light sticks simultaneously perform a unified performance.

In addition, since the seat library pairing method and system using short-distance wireless communication according to an embodiment of the present invention stores a seat library for the corresponding performance, minimizing errors due to interference with the seat library of other performances may be obtained.

In addition, since the seat library pairing method and system using short-distance wireless communication according to an embodiment of the present invention enables the pairing of a cheering light stick and a kiosk with an intuitive user experience, the time and inconvenience which are required for storing a seat library may be reduced. Therefore, the convenience for a user may be increased.

BRIEF DESCRIPTION OF THE DRAWINGS

FIG. 3A is a diagram for explaining information included in performance preparation data according to an embodiment of the present invention.

FIG. 3B is a diagram for explaining information included in performance preparation data according to an embodiment of the present invention.

DESCRIPTION OF EMBODIMENTS

Figure 1:
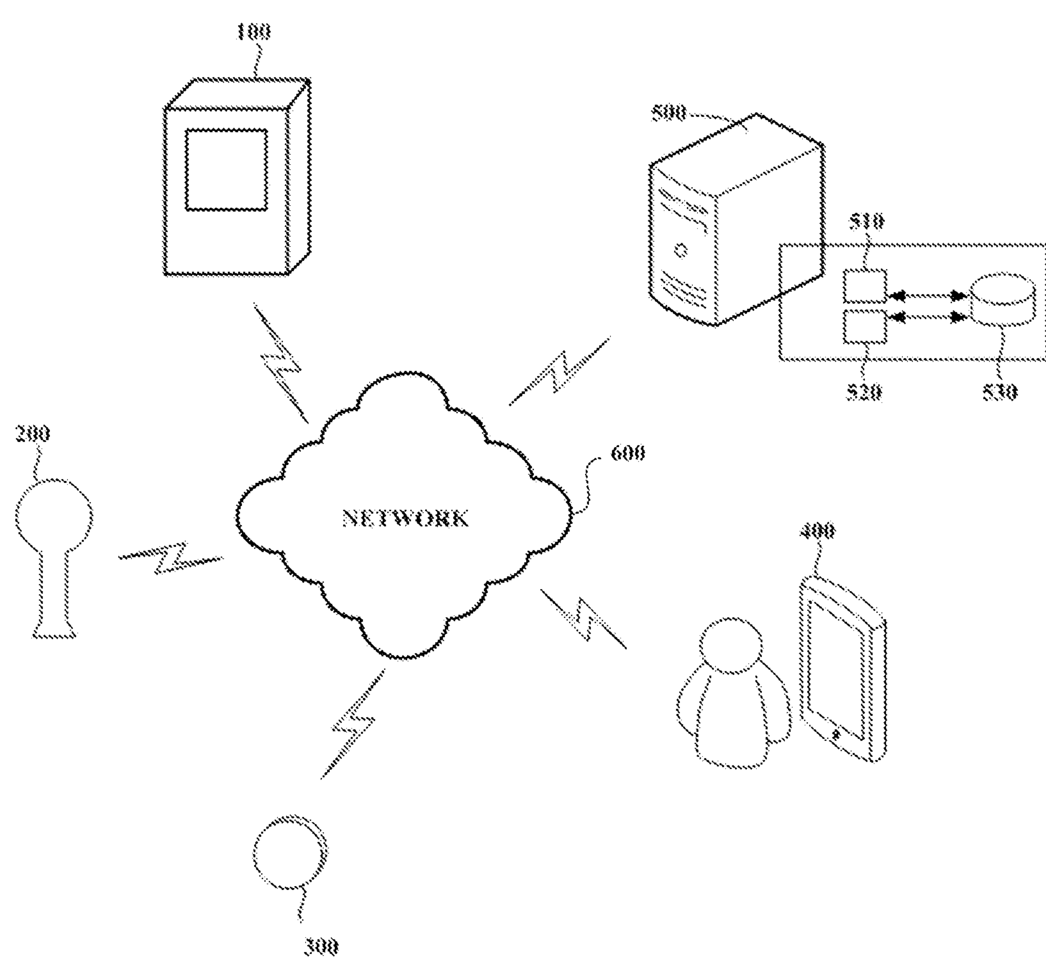
FIG. 1 is a conceptual diagram of a seat library pairing system using short-distance wireless communication according to an embodiment of the present invention.

Because embodiments of the present invention can have various transformations, specific embodiments will be illustrated in the drawings and be described with reference to the drawings. The advantages, features and methods for achieving the same will become apparent from the following description of the embodiments in conjunction with the accompanying drawings. However, the present invention is not limited to the embodiments described herein but may be modified in many different forms. It will be understood that, although the terms "first", "second", etc., may be used herein to distinguish one component from another component, these components should not be limited by these terms. In addition, a singular expression includes a plural expression, unless the context clearly states otherwise. In addition, it should be understood that the terms such as "include" or "have" are merely intended to indicate that features, or components described in the specification are present, and are not intended to exclude the possibility that one or more other features, or components will be added. In addition, sizes of components in the drawings may be exaggerated or reduced for convenience of explanation. In other words, since sizes and thicknesses of components in the drawings are arbitrarily illustrated for convenience of explanation, the present invention is not necessarily limited to what is illustrated.

Hereinafter, the embodiments of the present invention will be described in detail with reference to the accompanying drawings. In description with reference to the drawings, the same or corresponding components are given the same reference numerals, and the overlapping descriptions thereof will be omitted.

FIG. 1 is a conceptual diagram of a seat library pairing system using short-distance wireless communication according to an embodiment of the present invention.

Referring to FIG. 1, the seat library pairing system using short-distance wireless communication (hereinafter, library pairing system) according to an embodiment of the present invention may provide a service for pairing a seat library, which is data to be stored on a cheering light stick in advance of a performance in order to achieve a unified performance of various scenarios through a plurality of cheering light sticks placed at each different position at a performance hall.

The library pairing service may refer to a service connecting and interworking with each other in order to transmit/receive a program in the form of machine language produced and compiled to perform a specific function between devices. In an embodiment, library pairing refers to connecting and interworking with each other in short-distance communication in order to transmit a seat library which makes a plurality of cheering light operate in a unified performance at a performance hall from a kiosk to a cheering light stick.

In an embodiment, the library pairing system that provides the aforementioned library pairing service may include a kiosk 100, a cheering light stick 200, an account authentication device 300, a user terminal 400, a performance management server 500, and a network 600.

The kiosk 100 may provide a seat library that is paired with the cheering light stick 200 and matches the seat where the cheering light stick 200 is to be positioned. The kiosk 100 may be an unmanned information terminal installed in or around a performance hall.

The cheering light stick 200 refers to a small cheering tool that may emit light in various forms at sports events and concerts. The cheering light stick 200 may operate with various types of light emitting patterns depending on a seat library.

The account authentication device 300 refers to a device including an account information of a user that has the cheering light stick 200. The account authentication device 300 may perform a function of authenticating an account of the user through remote communication with the kiosk 100, a ticket authentication device, a vending machine such as goods, or the like.

The account information of the user is personal information of a user provided in accordance with the consent to provide personal information when the user signs up for services (for example, Weverse), and may include a user name, a date of birth, a mobile phone number, an email address, and a platform/service ID.

The user terminal 400 refers to a terminal such as a smart phone of a user who has the cheering light stick 200 and the account authentication device 300. The user terminal 400 may control the cheering light stick 200 by the user individually, or may check and manage the status of the seat library pairing with the cheering light stick 200, user account information associated with the account authentication device 300, or ticket reservation information related to performances.

The performance management server 500 refers to a computer system that provides information related to performances and performs some tasks. For example, the performance management server 500 may perform the roles of managing ticket reservation information corresponding to a user account and providing a seat library for each seat with the cheering light stick 200 through the kiosk 100.

The ticket reservation information refers to information on personal information of a user and the ticket purchased by the user and is provided from a predetermined ticket reservation website (for example, Interpark®, YES24®, etc.) where the user purchased a ticket for watching a performance, and may include at least one of a name of a person who reserved a ticket, a date of birth, a ticket website ID, a mobile phone number, a performance name, a performance date and time, a performance place, a reservation number, a number of tickets reserved, and seat information.

In addition, the seat information included in the ticket reservation information may include a seat information where the use wants to sit For example, the seat information may be in the form of "Seat F in Row 3, Section A, first floor."

The kiosk 100, the cheering light stick 200, the account authentication device 300, the user terminal 400, and the performance management server 500 may be connected through the network 10.

The network 10 according to an embodiment refers to a connection structure capable of exchanging information between each node such as the kiosk 100, the cheering light stick 200, the account authentication device 300, the user terminal 400, and the performance management server 500. An example of the network 300 includes a 3rd Generation Partnership Project (3GPP) network, a Long Term Evolution (LTE) network, a World Interoperability for Microwave Access (WIMAX) network, the Internet, Local Area Network (LAN), Wireless Local Area Network (Wireless LAN), Wide Area Network (WAN), Personal Area Network (PAN), a Bluetooth network, a satellite broadcasting network, an analog broadcasting network, and a Digital Multimedia Broadcasting (DMB) network, but is not limited thereto.

Hereinafter, the kiosk 100, the cheering light stick 200, the account authentication device 300, the user terminal 400, and the performance management server 500 implementing the library pairing system will be described in detail with reference to the accompanying drawings.

Kiosk 100

The kiosk 100 according to an embodiment of the present invention may be a predetermined computing device that provides a library pairing service.

A predetermined computing device providing a library pairing service in an embodiment of the present invention will be described based on the implementation of the kiosk 100 but may also be implemented through a mobile type computing device and/or a desktop type computing device and a peripheral device associated therewith.

In addition, according to an embodiment, the kiosk 100 may further include a predetermined server computing device that provides a library pairing service environment.

Figure 2:
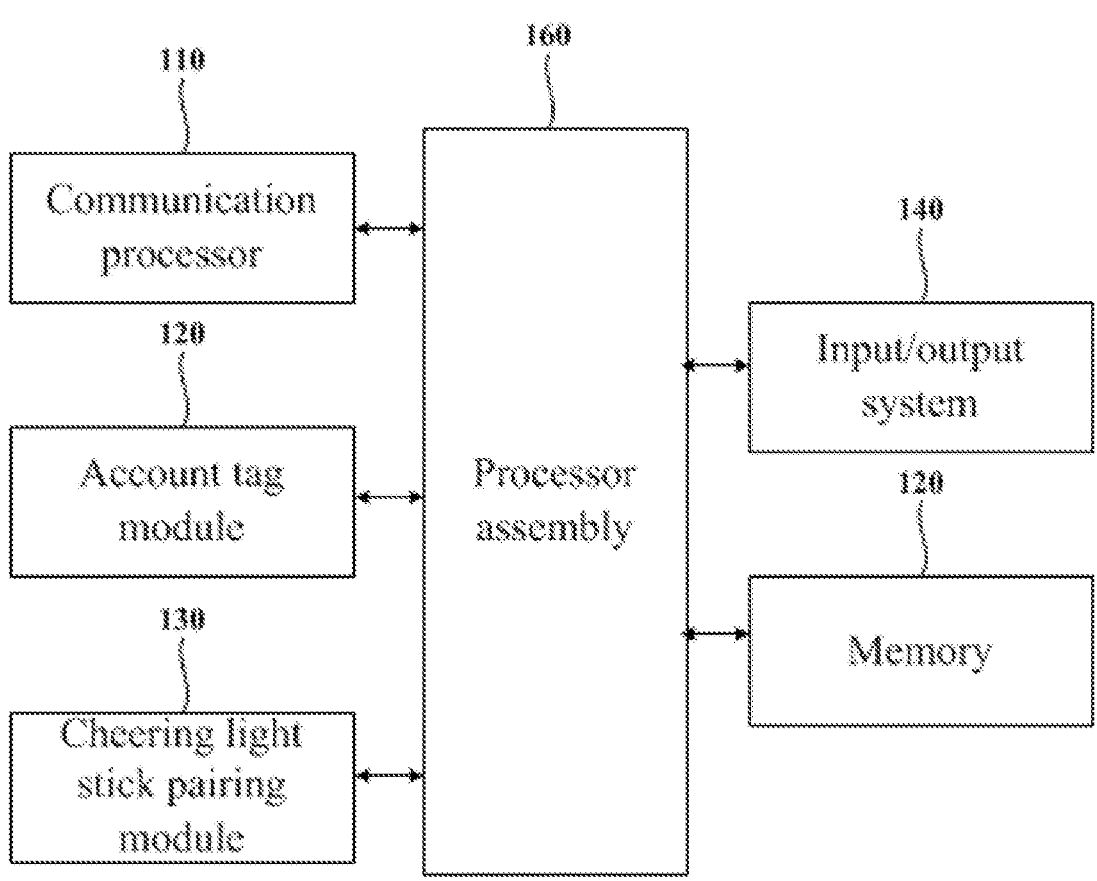
FIG. 2 is an internal block diagram of a kiosk according to an embodiment of the present invention.

FIG. 2 is an internal block diagram of a kiosk according to an embodiment of the present invention.

Referring to FIG. 2, from a functional perspective, the kiosk 100 may include a communication processor 110, an account tag module 120, a cheering light stick pairing module 130, an input/output system 140, a memory 150, and a processor assembly 160.

The communication processor 110 may include one or more devices for communicating with an external device. The communication processor 110 may communicate through a wireless or wired network.

In detail, the communication processor 110 may communicate with the performance management server 500 storing a content source for providing a library pairing service and may communicate with various user input components such as a controller receiving a user input.

In an embodiment, the communication processor 110 may transmit/receive various data related to the library pairing service to/from another terminal and/or an external server.

This communication processor 110 may wirelessly communicate data with at least one of a base station, an external terminal, and an arbitrary server on a mobile communication network built through a communication device capable of performing technical standards or communication methods (for example, LTE (Long Term Evolution), LTE-A (Long Term Evolution-Advanced), 5G NR (New Radio), and WIFI) for mobile communication, and may communicate through a wired connection.

In detail, in an embodiment, the communication processor 110 may transmit user account information to receive ticket reservation information corresponding to a user account from the performance management server 500 and a seat library for each seat where the user is seated in the corresponding performance.

In other words, since the kiosk 100 including the communication processor 110 is operated online, the user account information and the seat library are provided through the performance management server 500 only by the request from a user, so that it has an advantage on protecting personal information of the user by reducing the risk of leakage of the personal information.

The account tag module 120 may include a first short-distance communication processor for sensing a tagged device. Herein, the tagging may mean that the account authentication device 300 approaches the account tag module 120 within a predetermined distance.

In detail, the account tag module 120 may detect whether a tagged device (e.g., the account authentication device 300) is approached, and upon detection of the approaching it may communicate with the device in a short distance to acquire information stored in the device. The account tag module 120 may include a communication chip that performs short-distance communication such as Radio Frequency Identification (RFID), Near Field Communication (NFC), Magnetic Secure Transmission (MST) or Near Field Magnetic Induction (NFMI), or Bluetooth communication.

In an embodiment, the account tag module 120 may be an NFC reader (e.g., NFC tag pad) that performs an NFC communication.

In addition, the account tag module 120 may transmit/receive various data related to the library pairing service to/from an external device in the NFC communication.

This account tag module 120 is media using the communication protocol defined in the NFC international commercial standards ISO/IEC 18092 (or ECMA-340, NFCIC-1) and ISO/IEC 21481 (or ECMA-352, NFCIC-2). Specifically, data may be transmitted/received with an external device based on ISO/IEC 14443 (Proximity Card), ISO/IEC 15693 (Vicinity Card), JIS:X6319 (FeliCa), MIFARE, and the like.

In an embodiment of the present invention, the account tag module 120 may perform short-distance communication with the account authentication device 300 to acquire user account information when recognizing that the account authentication device 300 is positioned within a predetermined distance.

The cheering light stick pairing module 130 may include a second short-distance communication processor for sensing a tagged device.

In detail, the cheering light stick pairing module 130 may detect whether a tagged, mounted and seated device (e.g., the cheering light stick 200) is approached, and upon detection of the approaching the cheering light stick pairing module 130 may communicate with the device to transmit/receive data. The cheering light stick pairing module 130 may include a communication chip that performs short-distance communication such as Radio Frequency Identification (RFID), Near Field Communication (NFC), Magnetic Secure Transmission (MST) or Near Field Magnetic Induction (NFMI), or Bluetooth communication.

In addition, the cheering light stick pairing module 130 may transmit/receive various data related to the library pairing service to/from an external device based on short-distance communication.

In an embodiment, the cheering light stick pairing module 130 may perform short-distance communication with the cheering light stick 200 to transmit and receive various data for receiving the seat library when recognizing that the cheering light stick 200 is located within a predetermined distance.

The cheering light stick pairing module 130 may include a predetermined support member to stably fix the cheering light stick 200 positioned within a predetermined distance in terms of hardware.

For example, the predetermined support member may be implemented in a cradle type for mounting the cheering light stick 200, a pad type for placing the cheering light stick 200, or a box type having a space therein to accommodate the cheering light stick 200.

The input/output system 140 may include a sensor system, an input system, and a display system.

The sensor system may include at least one of an image sensor, a position sensor, an audio sensor, a distance sensor, a proximity sensor, and a contact sensor.

The image sensor 141 may capture an image and/or a video of a physical space around the kiosk 100.

In an embodiment, the image sensor 141 may capture and acquire an image (e.g., a ticket image (TI)) related to the library pairing service.

In addition, the image sensor 141 may be disposed on the front or/and rear side of the kiosk 100 to acquire an image in the disposed direction side and may capture an image of a paper ticket through a camera installed outside of the kiosk 100.

The image sensor 141 may include an image sensor device and a video processing module. Specifically, the image sensor 141 may process a still image or a moving image obtained by an image sensor device (for example, CMOS or CCD).

In addition, the image sensor 141 may process a still image or a moving image obtained through the image sensor device using an image processing module (e.g., OCR) to extract necessary information and transmit the extracted information to a processor.

The image sensor 141 may be a camera assembly including at least one or more cameras.

In addition, the aforementioned image sensor 141 may be operated while being included in the kiosk 100 according to an embodiment, or may be included in an external device (for example, an external server) to operate through interworking based on the aforementioned communication processor 110.

The audio sensor may recognize a sound around the kiosk 100.

In detail, the audio sensor may include a microphone capable of sensing a voice input of a user using the kiosk 100.

In an embodiment, the audio sensor may receive voice data necessary for the library pairing service from a user.

In an embodiment, the kiosk 100 may include a speaker to output voice data input based on the audio sensor.

The input system may sense a user input (e.g., a gesture, voice command, actuation of a button, or other type of input) related to the library pairing service.

Specifically, the input system may include a predetermined button, a touch sensor and/or the image sensor 141 for receiving user motion input, and the like.

In addition, the input system may be connected to an external controller to receive a user input.

A display system may output various information related to the library pairing service as a graphic image, and may serve to sense a touch input of a user for library pairing.

In an embodiment, the display system may display a user interface (UI), library pairing content, and/or content management system (CMS) based data.

Such displays may include at least one of a liquid crystal display (LCD), a thin film transistor-liquid crystal display (TFT LCD), an organic light-emitting diode (OLED), a flexible display, a three-dimensional display (3D display), and an e-ink display.

The aforementioned components may be disposed within the housing of the kiosk 100, and the user interface may include a touch sensor 145 on a display 143 configured to receive a user touch input.

In detail, the display system may include the display 143 that outputs an image, and the touch sensor 145 that senses a touch input of a user.

The display 143 may be implemented as a touch screen by forming a layer structure with the touch sensor 145 or being integrally formed therewith. Such a touch screen may function as a user input portion providing an input interface between the kiosk 100 and a user, and may provide an output interface between the kiosk 100 and the user.

A memory 150 may store any one or more of various application programs, data, and instructions for providing a library pairing service environment.

In the memory 150 in an embodiment, an application including an instruction for controlling the kiosk 100 may be stored.

In addition, the memory 150 may include a program area and a data area.

Herein, the program area according to an embodiment may be linked between an operating system (OS) for booting the kiosk 100 and performing a certain function, and the data area may store data generated by using the kiosk 100.

In addition, the memory 150 may include at least one or more non-transitory computer-readable storage media and a temporary computer-readable storage medium.

For example, the memory 150 may be various storage devices such as ROM, EPROM, flash drive, hard drive, and the like, and may include web storage that performs a storage function of the memory 150 on the Internet.

In an embodiment, the memory 150 may pre-store information necessary to perform a library pairing service.

In detail, in an embodiment, the memory 150 may prestore user account information, ticket reservation information, seat information, and performance preparation data in order to perform a library pairing service.

The performance preparation data refers to data in which various light emitting patterns to be emitted by the cheering light stick 200 are defined in advance for a seat where the cheering light stick 200 is to be positioned in order to direct a unified performance before the performance.

This performance preparation data is data that the cheering light stick 200 needs to store in advance before the start of a performance. Since each cheering light stick 200 is disposed at each different seat, each different performance preparation data may be stored according to seat information.

In addition, in an embodiment, the performance preparation data may include a light emitting pattern, a library, and a scenario.

FIG. 3A & FIG. 3B are diagrams for explaining information included in performance preparation data according to an embodiment of the present invention.

Referring to FIG. 3A, in an embodiment, a performance preparation data 1000 may include a plurality of library data 1010 to 1030.

The light emitting pattern defines the various forms of light emitting from the cheering light stick 200 according to components indicating whether light is emitted (for example, On/Off) and the change of the color, and brightness of the cheering light stick 200.

Such a light emitting pattern may also include a light emission effect of the cheering light stick 200 within a predetermined time to generate a dynamic visual effect.

For example, the light emission effect may include 1) a blink effect which makes the cheering light stick flicker quickly, 2) a gradation effect which makes the color of the cheering light stick 200 change gradually, and 3) a Fade In/Out effect which makes the brightness of the cheering light stick 200 gradually decreases or becomes brighter.

The library refers to data which presets the light emitting pattern of the cheering light stick 200, and may include an identification number and a component set value of the light emitting pattern (hereinafter, light emitting pattern set value).

For example, the color included in the light emitting pattern set value may be set as a hexadecimal code representing an RGB color, and the brightness included in the light emitting pattern set value may be set as a brightness value between 0 and 100, in which the higher is the value, the brighter is the brightness.

For example, a first library 1010 may refer to an identification number 0001 for identifying the first library 1010 and data set to light emission ON, first color, first brightness, and first light emission effect.

Referring to the example shown in FIG. 3A, the first library 1010 may be a binary array representing a light emitting pattern set value of (0001/ON/255,0,0/50/Blink). In addition, a third library 1030 may be a binary array representing a light emitting pattern set value of (0003/ON/0,0, 255/10/Grad). Meanwhile, in a second library 1020, since light emission is OFF, the light emitting pattern set values corresponding to color, brightness, and light emission effect may not be set.

In other words, when only a control signal to execute the first library 1010 is sent to the cheering light stick 200 which stores the plurality of libraries 1010 to 1030 at a performance hall, the cheering light stick 200 may operate and emit light with a first color of red corresponding to 255, 0, 0, a first brightness of 50 levels of brightness, and a first light emission effect of a sparkling Blink effect.

Scenario is data for changing and operating the light emitting pattern of the cheering light stick 200 for a preset time by setting the operation time (hereinafter, library set value) of at least one or more libraries for a predetermined time, and may include a scenario identification number for identifying each scenario.

Such a scenario may correspond to, for example, one song. In other words, the operation time of one scenario is the same as the playback time of one song, so that while the song is being played, the cheering light stick 100 may operate by changing the light emitting pattern according to the library set value.

For example, the first scenario 1100 may be data that has identification number 001 and is defined to operate the first library for 5 seconds, then operate the second library for 3 seconds, and then operate the third library for 2 seconds.

Referring back to FIG. 3B, in an embodiment, the performance preparation data 1000 may include a plurality of scenarios 1100 and 1200.

In detail, referring to the example illustrated in FIG. 3B, the first scenario 1100 may include a library set value of (001, 0001-5 sec/0002-3 sec/0003-2 sec). In addition, the second scenario 1200 may include a library set value of (002, 0005-8 sec/0002-30 sec/0003-14 sec).

In other words, when only a low-capacity control signal to make the cheering light stick 200 operate the first scenario 1100 is sent to the cheering light stick 200 which stores the plurality of scenarios 1100 and 1200 at a performance hall, the cheering light stick 200 may operate a first light emitting pattern according to the first library 1010 for 5 seconds, then a second light emitting pattern according to the second library 1020 for 3 seconds, and then a third light emitting pattern according to the third library 1030 for 2 seconds.

In these libraries and scenarios, the identification number is the same for each seat where the cheering light stick 200 is to be disposed, but the light emitting pattern set value and the library set value are different, so that light may be emitted differently accordingly.

In a detailed example, even when a first cheering light stick disposed on a first seat storing the first library 1010 and a second cheering light stick disposed on a second seat storing the first library 1010 have the same identification number as 0001, the light emitting pattern set values set in the first library 1010 may be different from each other.

For example, the first library may include [a first seat-first library] that is a first library for the first seat, [a second seat-first library] that is a first library for the second seat, and [an n-th seat-first library].

[The first seat-first library] to [the n-th seat-first library] may be defined according to each light emitting pattern set value in order for the cheering light sticks disposed in the first to n-th seats to have a specific form when viewed as a whole and perform a unified performance direction. Accordingly, as long as a performance director directs the execution of the first library, the cheering light stick of each seat may read the first library stored in the corresponding seat and operate according to the light emitting pattern set value defined in the first library. Therefore, a unified performance direction may be achieved.

Similarly, the first cheering light stick disposed in the first seat and the second cheering light stick disposed in the second seat storing the same first scenario 1100 have the same identification number as 001. Even when the same first scenario 1100 is stored, a library set value designated in the first scenario 1100 may be different.

In other words, a performance manager uses the first library and the first scenario having different set values for each seat in order for the cheering light sticks 200 disposed at each seat to operate simultaneously but to emit different light according to the first library and the first scenario set value. Hence, when viewed from the front, it is possible to direct an overall performance to appear in a specific form or shape.

Back again, the performance preparation data may be mapped to each seat to direct a different light emitting pattern for each seat and a number of the preparation data corresponding to the number of seats may be stored in the memory 150. In other words, each seat and performance preparation data may be mapped to each other, but is not limited thereto. According to an embodiment, by grouping seats to be operated with a common light emitting pattern, the light emitting pattern set value for each group may be defined to generate the performance preparation data.

Accordingly, the cheering light stick 200 needs to store in advance the performance preparation data corresponding to each seat to be disposed at the time of a performance, and the kiosk 100 may guide this process to a user by providing a library pairing service. More details thereon will be provided later.

Hereinafter, the performance preparation data 1000 corresponding to one seat on which the cheering light stick 200 is to be disposed will be described as a seat library.

In other words, the kiosk 100 including the memory 150 for storing the aforementioned plurality of data for performing the library pairing service may be implemented offline. Since the offline type kiosk 100 stores and keeps user-related information in advance, it is possible to reduce the cost of building the communication function of the kiosk 100 and it is possible for the kiosk to be installed where the communication infrastructure is not preestablished. Accordingly, it has the benefit of expanding the area where the kiosk may be utilized.

The processor assembly 160 may include at least one or more processors capable of executing commands of an application stored in the memory 150 to perform various tasks for creating a library pairing service environment.

In an embodiment, the processor assembly 160 may control the overall operation of components through an application of the memory 150 to provide a library pairing service.

The processor assembly 160 may be a system on chip (SOC) suitable for the kiosk 100 including a central processing unit (CPU) and/or a graphic processing unit (GPU), may execute an operating system (OS) and/or an application program stored in the memory 150, and may control each component mounted in the kiosk 100.

In addition, the processor assembly 160 may internally communicate with each component through a system bus, and may include one or more predetermined bus structures including a local bus.

In addition, the processor assembly 160 may be implemented using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors, and electric units for the performance of other functions.

In an embodiment, the processor assembly 160 may recognize the account authentication device 300 and the cheering light stick 200 using short-distance wireless communication based on the account tag module 120 and the cheering light stick pairing module 130.

In addition, in an embodiment, the processor assembly 160 may acquire user account information included in the recognized account authentication device 300 based on the communication processor 110.

In addition, in an embodiment, the processor assembly 160 may detect ticket reservation information corresponding to the acquired user account information.

In addition, in an embodiment, the processor assembly 160 may extract seat information included in the detected ticket reservation information.

In addition, in an embodiment, the processor assembly 160 may determine a seat library according to the extracted seat information.

In addition, in an embodiment, the processor assembly 160 may pair the cheering light stick 200 with the kiosk 100 to transmit the determined seat library.

In addition, in an embodiment, the processor assembly 160 may transmit the determined seat library to the paired cheering light stick 200.

In other words, in an embodiment, the processor assembly 160 performing the aforementioned steps may process the overall process of providing a seat library according to the seat of a user by pairing the kiosk 100 and the cheering light stick 200 of the user.

In addition, according to an embodiment, the kiosk 100 may further perform at least a portion of functional operations performed by the performance management server 500 described later.

The kiosk 100 including the plurality of configurations described above may be implemented as an integrated type or a separate type in terms of hardware.

Figure 4:
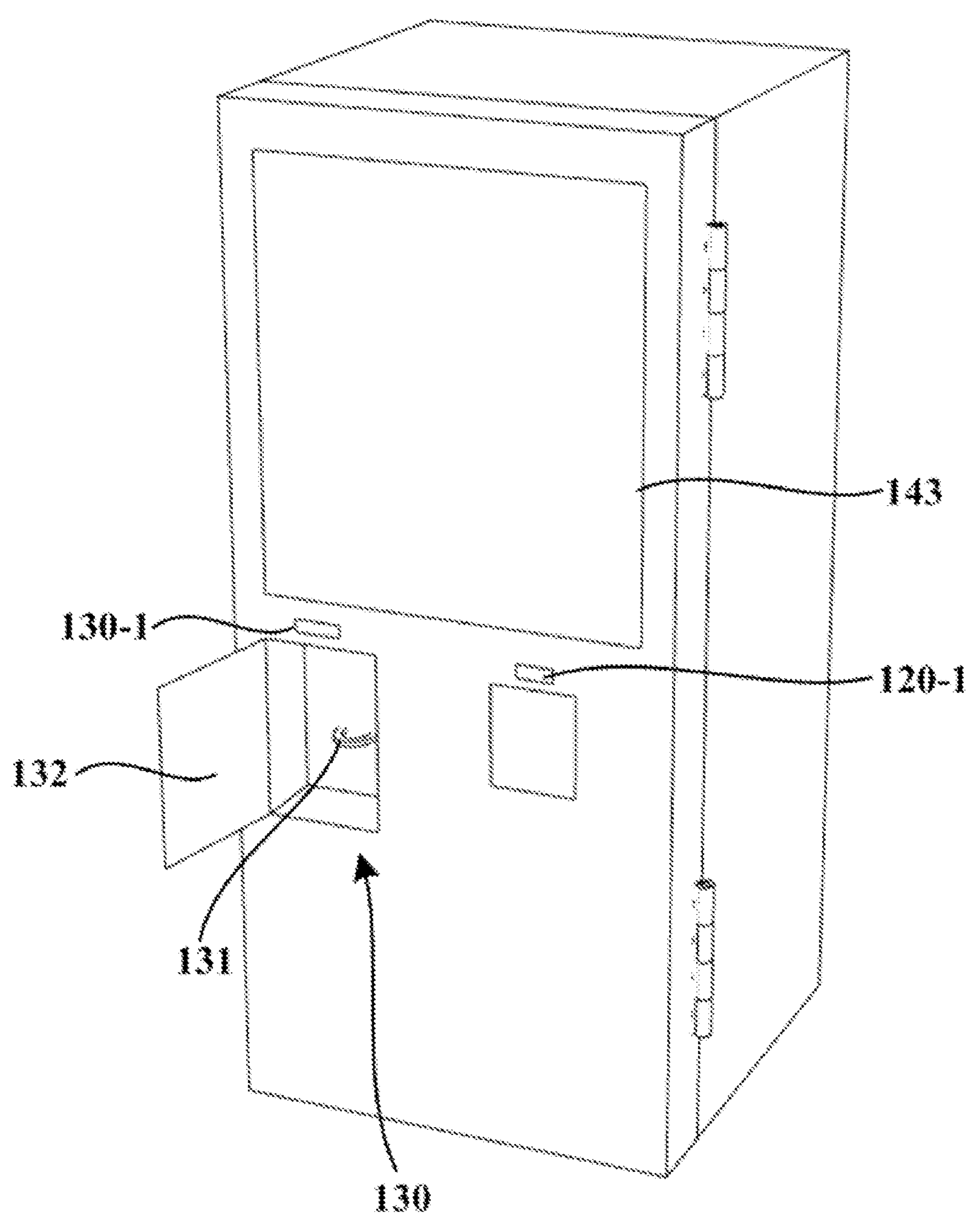
FIGS. 4 and 5 are examples of a shape of the kiosk according to an embodiment of the present invention.
Figure 5:
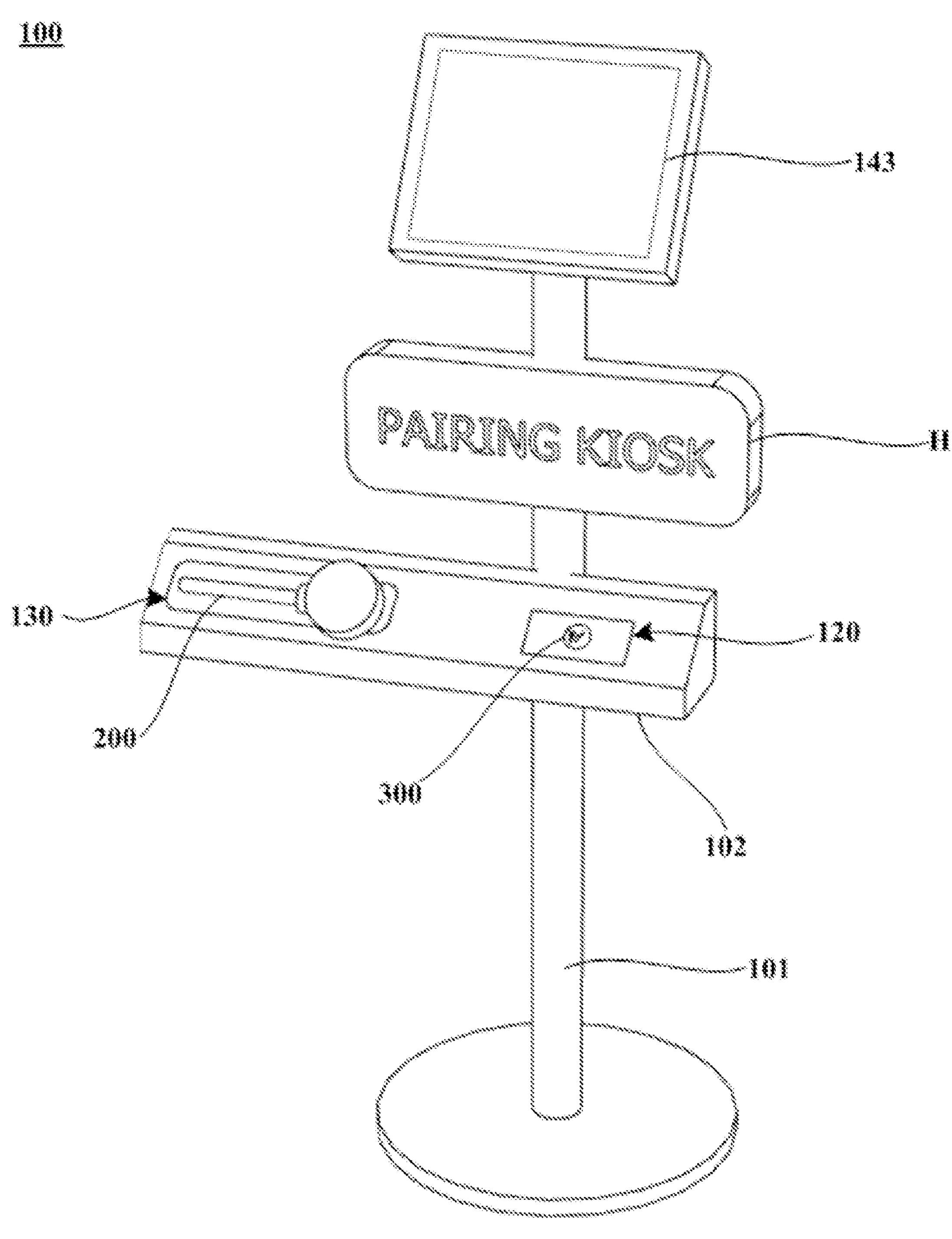

FIGS. 4 and 5 are examples of a shape of the kiosk according to an embodiment of the present invention.

FIG. 4 is a diagram showing an integrated type in which the account tag module 120 and the cheering light stick pairing module 130 are installed in the housing of the kiosk 100, and FIG. 5 is a diagram showing a detachable type in which the account tag module 120 and the cheering light stick pairing module 130 are separated from the housing and installed individually.

Referring to FIG. 4, when the kiosk 100 is an integrated type according to an embodiment, the kiosk 100 may include the account tag module 120 and the cheering light stick pairing module 130 in a housing.

In this embodiment, the account tag module 120 and the cheering light stick pairing module 130 may be installed at a position where a user may mount the cheering light stick 200 or tag the account authentication device 300 easily.

For example, as shown in FIG. 4, the account tag module 120 and the cheering light stick pairing module 130 may be installed on one side of a lower end of the display 143.

In addition, in an embodiment, the account tag module 120 may be installed on an outer surface of the kiosk 100 in the form of a pad capable of tagging the account authentication device 300.

In addition, in an embodiment, the cheering light stick pairing module 130 may be installed in the form of a box having a space therein to accommodate and mount the cheering light stick 200.

In addition, in an embodiment, the cheering light stick pairing module 130 may include a predetermined cradle 131 installed in an inner space to fix the cheering light stick 200 accommodated therein, or may also include a cover 132 to prevent the detachment of the cheering light stick 200 accommodated therein and block radio waves.

In addition, the account tag module 120 and the cheering light stick pairing module 130 may further include a first LED module 120-1 and a second LED module 130-1 informing the plurality of modules that a predetermined device (e.g., the cheering light stick 200 and the account authentication device 300) has been normally recognized.

In detail, in an embodiment, the kiosk 100 may operate the first LED module 120-1 when the account authentication device 300 is normally recognized in the account tag module 120.

In addition, in an embodiment, the kiosk 100 may operate the second LED module 130-1 when the cheering light stick 200 is normally recognized and mounted on the cheering light stick pairing module 130.

In addition, the second LED module 130-1 may be operated even when predetermined data has been transmitted to the cheering light stick 200. In this embodiment, the cheering light stick pairing module 130 may open the cover 132 to provide the cheering light stick 200 to a user when the second LED module 130-1 is operated.

The kiosk 100 of an integrated type does not require an additional device other than the kiosk 100. Therefore, increasing the simplicity of installation may be achieved.

On the other hand, referring to FIG. 5, when the kiosk 100 is a detachable type according to another embodiment, the display 143, the account tag module 120 and the cheering light stick pairing module 130 may be separated from the housing H of the kiosk 100 and installed individually.

In this another embodiment, the components of the kiosk 100 except for the account tag module 120 and the cheering light stick pairing module 130 may be disposed in the housing H.

In addition, in another embodiment, the kiosk 100 may further include a predetermined configuration (for example, a support 101 and a shelf 102) for individually installing the display 143, the account tag module 120 and the cheering light stick pairing module 130.

In detail, in another embodiment, the kiosk 100 may be further installed with the shelf 102 for mounting the support 101, the account tag module 120 and the cheering light stick pairing module 130 in order to fix the display 143 to a position separated from the ground by a predetermined height.

The display 143 may be positioned at an upper end of the support 101, and the housing H may be positioned at one side of the support 101.

In addition, the shelf 102 may be installed on one side of the support 101 as shown in FIG. 5, or may be installed in a form such as a desk separately from the support 101.

In addition, the shelf 102 may have a structure horizontal to the ground in order to maintain a seated state of the account authentication device 300 and the cheering light stick 200 seated in the account tag module 120 and the cheering light stick pairing module 130 in the process of pairing.

The kiosk 100 of this detachable type may manipulate the display 143 with the cheering light stick 200 and the account authentication device 300 mounted thereon. Therefore, increasing the convenience of a user in manipulating a device may be achieved.

Cheering Light Stick 200

In an embodiment of the present invention, the cheering light stick 200 may be a predetermined device that emits light according to the seat library received from the kiosk 100 based on the library pairing service.

Figure 6:
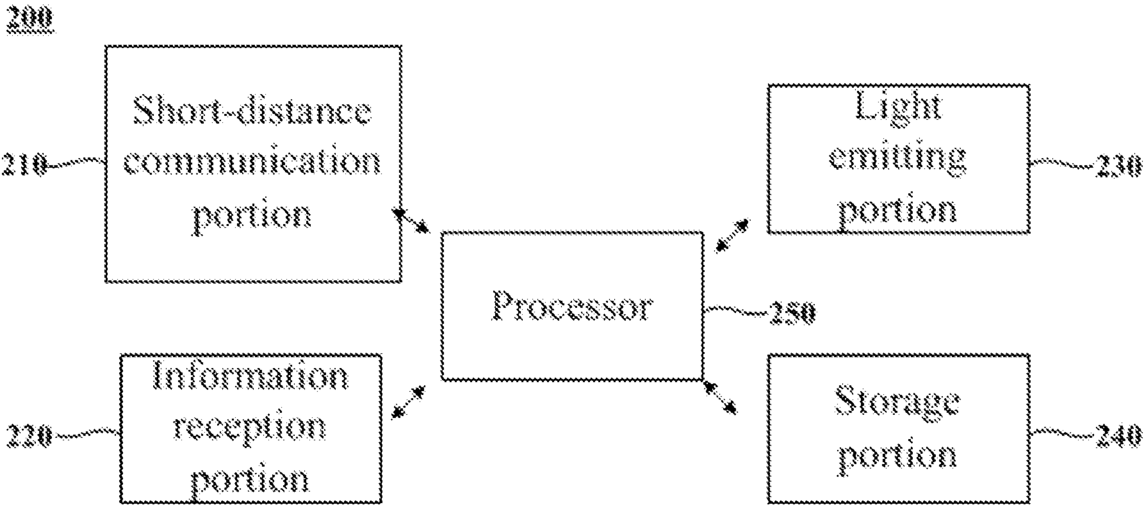
FIG. 6 is an internal block diagram of a cheering light stick according to an embodiment of the present invention.

FIG. 6 is an internal block diagram of a cheering light stick according to an embodiment of the present invention.

Referring to FIG. 6, the cheering light stick 200 may include a short-distance communication portion 210, an information reception portion 220, a light emitting portion 230, a storage portion 240, and a processor 250.

The short-distance communication portion 210 may include one or more devices for communicating with an external device. The short-distance communication portion 210 may communicate through a wireless network.

In an embodiment, the short-distance communication portion 210 may transmit/receive various data related to the library pairing service to/from another terminal and/or an external server.

In detail, in an embodiment, the short-distance communication portion 210 may connect the communication between the kiosk 100 and the cheering light stick 200 by performing pairing based on the cheering light stick pairing module 130 of the kiosk 100, and accordingly, may receive seat information of a user and a seat library corresponding to the seat.

The short-distance communication portion 210 may include a wireless communication module (e.g., at least one of NFC, RF transmitter/receiver, ZigBee, Bluetooth, and WIFI module).

In an embodiment, the short-distance communication portion 210 may receive at least one piece of data of user account information, user seat information, and a seat library from the kiosk 100 through short-distance communication in a Bluetooth.

The information reception portion 220 may receive information transmitted from the kiosk 100 and other devices in a broadcasting method.

In detail, in an embodiment, the information reception portion 220 may receive a signal transmitted from the kiosk 100 and other devices without designating a recipient.

The light emitting portion 230 may perform a function of emitting light according to a signal received based on the information reception portion 220.

The light emitting portion 230 may include one or more light source elements, and the light source may be, for example, a light emitting diode (LED). In addition, the light emitting portion 230 may include LEDs of different colors, for example, including at least one of a red LED, a green LED, a blue LED, and a white LED.

When the light emitted from each of these LEDs is mixed, a wide range of colors may be produced, and the mixed color is determined based on the ratio of the light intensity emitted from each LED, and the light intensity emitted from each LED is may be proportional to the driving current of each LED.

In the above description, an LED as the light source of the light emitting portion 230 has been described as an example, but the type of the light source is not limited to the LED. According to another embodiment, an organic light emitting diode (OLED) may also be used as the light source.

The storage portion 240 may store any one or more of various application programs, applications, data, and instructions for providing a library pairing service environment.

In addition, the storage portion 240 may store data received or generated from other components of the library pairing system. The storage portion 240 may be, for example, various storage devices such as a ROM, an EPROM, a flash drive, a hard drive, and the like, and may include a memory, a cache, and a buffer.

In an embodiment, the storage portion 240 may pre-store information necessary for the cheering light stick 200 to emit light.

For example, the storage portion 240 may pre-store light emitting pattern data.

The light emitting pattern data means data including a value corresponding to each light emitting pattern set value defined in an embodiment in order to express all colors and brightness that may be implemented by the cheering light stick. For example, in terms of color, the light emitting pattern data may include a plurality of pieces of data having values of (0, 0, 0), (0, 0, 1), (0, 0, 2) . . . (n, n, n). In addition, in terms of brightness, the light emitting pattern data may include a plurality of pieces of data having values of 0, 1, 2, . . . n.

In other words, the storage portion 240 may pre-store such light emitting pattern data, and accordingly, a user may manually set whether the cheering light stick 200 emits light, color, brightness, and light emission effect regardless of whether the seat library is stored.

In addition, in an embodiment, the storage portion 240 may store information necessary to perform a library pairing service.

For example, the storage portion 240 may store a seat library. In this embodiment, the seat library may be received from another device and stored in the storage portion 240.

The processor 250 may perform a data processing function, control the signal flow between the internal configurations of the cheering light stick 200 and perform general operations such as power supply control of the cheering light stick 200. The processor 250 may include at least one processor.

In addition, the processor 250 may internally communicate with each component through a system bus, and may include one or more predetermined bus structures including a local bus.

In addition, the processor 250 may be implemented using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors, and electric units for the performance of other functions.

In an embodiment, the processor 250 may control the light emitting pattern of the light output from the light emitting portion 230 by controlling the driving current of each LED of the light emitting portion 230.

Thus, in an embodiment, the processor 250 may control the cheering light stick 200 including a plurality of LEDs, and may form a predetermined text, image, video, or the like.

The aforementioned short-distance communication portion 210 and the information reception portion 220 may have a functional configuration separately illustrated in order to distinguish at least some functions of the processor 250 from general functions of the processor 250.

The cheering light stick 200 including the aforementioned configurations may operate according to at least one or more pieces of data stored in the storage portion 240 under the control of the processor 250, and as a plurality of users gather at a performance hall, a performance direction of a plurality of such cheering light sticks 200 being arranged to form a predetermined phrase, image, or video using the cheering light stick 200 may be achieved.

Account Authentication Device 300

In an embodiment, in order to perform a function of authenticating the account of a user who wants to use the cheering light stick 200, the account authentication device 300 may include a short-distance communication chip 310, a battery 320, a charging portion 330, a storage module 340, and a control module 350.

The short-distance communication chip 310 may be an NFC card, and may include any type of device readable by an NFC card reader.

For example, the NFC card is a device including an NFC chip and a coil (antenna), and the form of the NFC card may be various such as a card type, a tag type, a sticker type, and the like.

In an embodiment, the short-distance communication chip 310 may transmit and receive data by communicating with the kiosk 100 based on the account tag module 120 of the kiosk 100.

The battery 320 may receive external and/or internal power under the control of the control module 350 to supply power required for the operation of each component in the account authentication device 300.

The battery 320 may further include a DC/DC converter capable of converting the received power into a voltage level that may be used by the payloads of a seed spray 300.

In addition, the battery 320 includes at least one or more battery cells. The type of each battery cell is not particularly limited as long as it may be repeatedly charged and discharged, such as a lithium ion cell.

The charging portion 330 may include a wired and wireless charging module for providing a wired and wireless charging process for supplying power required for the operation of the account authentication device 300.

The storage module 340 may store any one or more of various application programs, applications, data, and instructions for providing a library pairing service environment.

In addition, the storage module 340 may store data received or generated from other components of the library pairing system. The storage module 340 may be, for example, various storage devices such as a ROM, an EPROM, a flash drive, a hard drive, and the like, and may include a memory, a cache, a buffer, and a web storage.

In an embodiment, the storage module 340 may store information necessary to perform a library pairing service.

For example, the storage module 340 may store at least one of a user-specific NFC ID and user account information.

In this embodiment, the user-specific NFC ID may mean letters and numbers including a predetermined serial number assigned to each account authentication device 300.

In an embodiment, the storage module 340 may receive and store the seat library from other components of the library pairing system.

The control module 350 may perform a function of transmitting at least one or more data stored in the storage module 340 of the account authentication device 300 by controlling the overall configuration described above.

In detail, the control module 350 may transmit the user account information stored in the storage module 340 to the kiosk 100.

In other words, in an embodiment, the account authentication device 300 may perform a role of authenticating individual users by transmitting and receiving a user-specific NFC ID and user account information who want to use the cheering light stick 200.

In addition, the number of the account authentication device 300 that may be possessed per user in case of the number of artists cheered by the user being plural.

In addition, the account authentication device 300 may be implemented in various embodiments in combination with other configurations for easy portability by a user.

Figure 7:
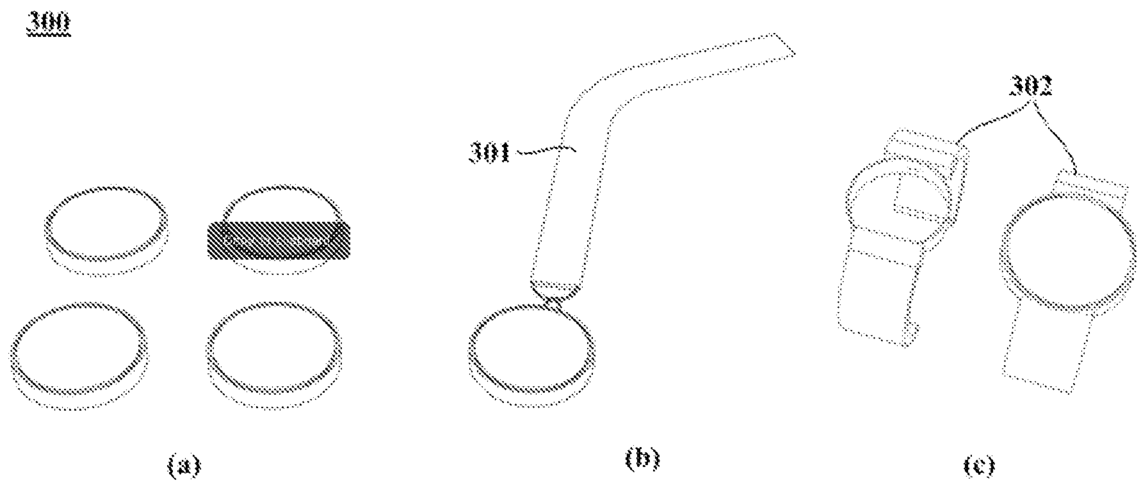
FIG. 7 is an example showing the shape of an account authentication device according to an embodiment of the present invention.

FIG. 7 is an example showing the shape of an account authentication device according to an embodiment of the present invention.

Referring to the examples of FIG. 7, the account authentication device 300 may be a chip type as shown in (a). The chip-type account authentication device 300 may have a flat top and bottom surfaces.

In addition, the account authentication device 300 may also be implemented as a wearable type that is mounted on the body of a user in combination with other parts.

In detail, the account authentication device 300 may be combined with a first strap 301 that may be hung around the neck as shown in (b) and a second strap 302 that may be mounted on the wrist as shown in (c).

The various shapes of the account authentication device 300 as described above make it easy for a user to carry and simultaneously maintain the account authentication device 300 at a predetermined position for a predetermined time for pairing or tagging. Therefore, increasing the convenience of a user in using the account authentication device 300 may be achieved.

User Terminal 400

The user terminal 400 according to an embodiment of the present invention may be a predetermined computing device in which an application for performing a library pairing service is installed.

In detail, in terms of hardware, the user terminal 400 may include a mobile type computing device and a desktop type computing device on which a pairing application is installed.

For example, the mobile type computing device may include a smart phone, a mobile phone, a digital broadcasting terminal, personal digital assistants (PDA), a portable multimedia player (PMP), a tablet PC, and the like.

In addition, the desktop type computing device may include a device installed with a program for executing a library pairing service based on wired/wireless communication, such as a fixed desktop PC, a laptop, and a personal computer such as an ultrabook on which an application is installed.

For convenience of description, an embodiment of the present invention may be described based on a case where the user terminal 400 is a smart phone, which is a mobile type computing device.

From a functional point of view, the user terminal 400 may include a memory 410, a processor 420, a communication module 430, and an input/output system 440.

In detail, in the memory, a cheering light stick management application 411 is stored, and the cheering light stick management application 411 may store any one or more of various application programs, data and instructions for providing a library pairing service environment.

In other words, the memory 410 may store commands and data that may be used to create a library pairing service environment.

The processor 420 may include at least one or more processors capable of executing commands of the cheering light stick management application 411 stored in the memory to perform various tasks for creating a library pairing service environment.

In an embodiment, the processor 420 may control the overall operation of the components through the cheering light stick management application 411 of the memory in order to provide a library pairing service.

The communication module 430 may include one or more devices for communicating with an external device. The communication module may communicate through a wireless network.

In detail, the communication module 430 may communicate with a terminal that stores a content source for implementing a library pairing service environment (in an embodiment, the kiosk 100, the cheering light stick 200 and the account authentication device 300) and an external server (in an embodiment, a ticket sales server and the performance management server 500), and may communicate with various user input components, such as a controller that has received a user input.

The input/output system 440 may include a sensor system, an input system, and a display system, and since it is the same as the function of the input/output system described above in the kiosk 100, the content thereof will be applied without a detailed description.

The components may be configured to be included in the housing of the user terminal 400.

In an embodiment, the user terminal 400 may communicate with a predetermined platform and service server.

In addition, in an embodiment, the user terminal 400 may acquire user account information including a plurality information related to the personal information of a user (for example, name, date of birth, service ID, mobile phone number, etc.) from a predetermined platform and service server.

In this embodiment, when a user has not presently signed up for a predetermined platform and service, the user terminal 400 may also acquire user account information by providing a predetermined membership registration process for generating user account information.

In addition, the user terminal 400 may acquire a user-specific NFC ID of the account authentication device 300 tagged to the user terminal 100.

When the account authentication device 300 is not recognized and tagging is not possible, the user terminal 400 in an embodiment allows a user to directly input and register the user-specific NFC ID based on a predetermined input process to acquire the user-specific NFC ID.

In addition, in case the acquired user-specific NFC ID is plural, the user terminal 400 may register a plurality of account authentication devices 300 corresponding to the number of the acquired user-specific NFC ID on the cheering light stick management application 411.

In addition, the user terminal 400 may activate only the account authentication device 300 that a user wants to use among at least one or more registered account authentication devices 300.

In addition, the user terminal 400 may select a predetermined mode for operating the light emitting pattern of the cheering light stick 200.

For example, the user terminal 400 may set modes such as a performance mode and a self mode. In this embodiment, the performance mode may include an offline performance mode and an un-tact performance mode.

When the offline performance mode is selected, the user terminal 400 may provide a process for selecting a performance which stores a seat library by checking the storage state of the seat library, or a process for explaining a position of the kiosk 100 which provides the seat library.

When the un-tact performance mode is selected, the user terminal 400 may provide a process for providing a guide for downloading predetermined performance preparation data.

When the self mode is selected, the user terminal 400 may provide a process for manually setting the light emitting pattern data which is pre-stored in the cheering light stick 200.

As above, by setting a predetermined mode on the user terminal 400, a user may tag the account authentication device 300 to perform pairing at a performance hall or at home, and may perform operations such as controlling the color of the mood light even when the user does not watch a performance in usual days.

In addition, based on the cheering light stick management application 411, the user terminal 400 may guide the location of the kiosk 100 at a performance hall and the operating time of a booth selling goods, or provide information related to pairing such as outputting a self pairing guide video.

Performance Management Server 500

The performance management server 500 according to an embodiment of the present invention may perform a series of processes for providing a library pairing service.

In detail, in an embodiment, the performance management server 500 may provide the library pairing service by exchanging data necessary for the library pairing service to be driven in an external device, such as the kiosk 100, with the external device.

In more detail, in an embodiment, the performance management server 500 may provide an environment in which a plurality of applications installed on a plurality of devices providing a library pairing service may operate.

To this end, the performance management server 500 may include an application program, data and/or instructions for operating an application, and may transmit/receive data based thereon to/from the external device.

In addition, in an embodiment, the performance management server 500 may communicate with an external server (for example, a ticket sales server) to acquire at least one or more pieces of ticket reservation information.

In this connection, the ticket reservation information may include a name of a person who purchased a ticket, a date of birth, a ticket website ID, a mobile phone number, a performance name, a performance date and time, a performance place, a reservation number, the number of tickets reserved, and seat information.

In addition, in an embodiment, the performance management server 500 may provide ticket reservation information corresponding to user account information among the acquired at least one or more pieces of ticket reservation information to an external device (e.g., the kiosk 100).

In this embodiment, the performance management server 500 may determine whether the ticket reservation information and the user account information are matched based on a mobile phone number. This embodiment is an exemplary one, and the way to match the ticket reservation information with the user account may be implemented in various embodiments such as using other user personal information besides the mobile phone number.

In addition, in an embodiment, the performance management server 500 may extract seat information from the corresponded ticket reservation information.

The seat information is information that is a reference to classify the performance preparation data 1000 by seat, and in an embodiment, the performance management server 500 may associate this seat information with the performance preparation data 1000 to create a plurality of seat libraries.

In addition, in an embodiment, the seat information may include at least one of a seat number and a pixel number.

In an embodiment, while seat information is exposed to a user as a seat number used in the actual performance hall, for example, “No. 1 in Row A, Section 12, third floor”, it is acknowledged by a device which directs a lighting emitting pattern as a pixel number based on the seat layout for the convenience of direction.

In other words, the performance preparation data using pixel numbers written on a director’s device is converted to seat numbers when a seat library is made by the performance management server 500. In order to process this step, each pixel number and seat number may be corresponded in advance.

In addition, the performance management server 500 may pre-store and manage a plurality of seat libraries generated and categorized by each seat information in a database 530.

In addition, the performance management server 500 may provide the seat library generated in correspondence to the extracted seat information to an external device (e.g., the cheering light stick 200 and the account authentication device 300).

In addition, the performance management server 500 may store and manage various application programs, instructions and/or data for implementing the library pairing service.

Referring further to FIG. 1, in an embodiment, the performance management server 500 may be implemented as a predetermined computing device including at least one or more processor modules 510 for data processing, at least one or more communication modules 520 for exchanging data with an external device, and at least one or more memory modules 530 for storing various applications, data and/or instructions for providing a library pairing service.

Herein, the database 530 may store any one or more of an operating system (OS), various application programs, data, and instructions for providing a library pairing service.

In addition, the database 530 may include a program area and a data area.

Herein, the program area according to an embodiment may be linked between an operating system (OS) for booting the server and functional elements, and the data area may store data generated by the server during its operation.

In an embodiment, the database 530 may be various storage devices such as ROM, RAM, EPROM, flash drive, hard drive, and the like, and may include web storage that performs a storage function of the database 530 on the Internet.

In addition, the database 530 may be a recording medium detachable from the server.

The processor module 510 may control the overall operation of each of the aforementioned units in order to implement the library pairing service.

The processor module 510 may be a system on chip (SOC) suitable for the server including a central processing unit (CPU) and/or a graphic processing unit (GPU), may execute an operating system (OS) and/or an application program stored in the database 530, and may control each component mounted on the server.

In addition, the processor module 520 may internally communicate with each component through a system bus, and may include one or more predetermined bus structures including a local bus.

In addition, the processor module 510 may be implemented using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors, and electric units for the performance of other functions.

In the above description, it has been described that the performance management server 500 according to an embodiment of the present invention performs the functional operation as described above. However, according to an embodiment, various embodiments may be possible, such as performing at least a portion of the functional operation performed by the performance management server in an external device (e.g., the kiosk 100), and further performing at least a portion of the functional operation performed in the external device in the performance management server 500.

Method of Providing a Seat Library to the Cheering Light Stick 200

Hereinafter, a method of providing a seat library, by at least one or more processors of the kiosk 100 according to an embodiment of the present invention, to the cheering light stick 200 will be described in detail with reference to the accompanying FIGS. 8 to 10.

In an embodiment of the present invention, at least one or more processors of the kiosk 100 may execute at least one or more applications stored on at least one or more memories 150 or may operate in a background state.

Hereinafter, the at least one or more processors operating to execute the instructions of the application to perform the method of providing the library pairing service described above will be briefly described as being performed by the processor assembly 160.

Figure 8:
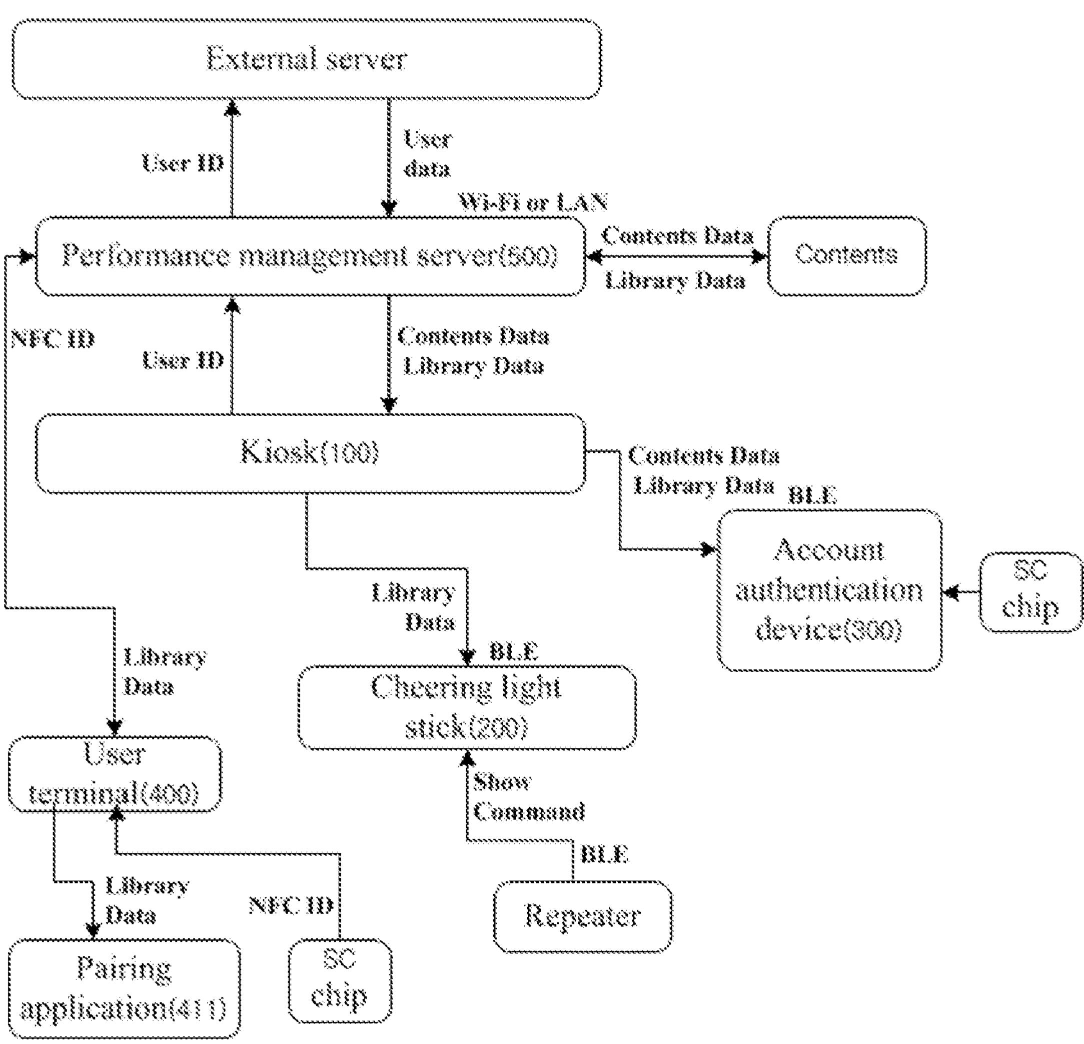
FIG. 8 is a flowchart explaining a method of providing a seat library according to an embodiment of the present invention.

FIG. 8 is a flowchart for explaining a method of providing a seat library according to an embodiment of the present invention.

Referring to FIG. 8, the processor assembly 160 of the kiosk 100 may provide a seat library to at least one or more terminals including the cheering light stick 200 and/or the account authentication device 300.

In an embodiment, the cheering light stick 200 may receive a seat library directly from the kiosk 100. In another embodiment, the seat library may be indirectly provided from the account authentication device 300 provided the seat library with from the kiosk 100.

In the following embodiment, for convenience of description, a method in which the processor assembly 160 controls the cheering light stick pairing module 130 to provide the seat library directly to the cheering light stick 200 will be described.

Figure 9:
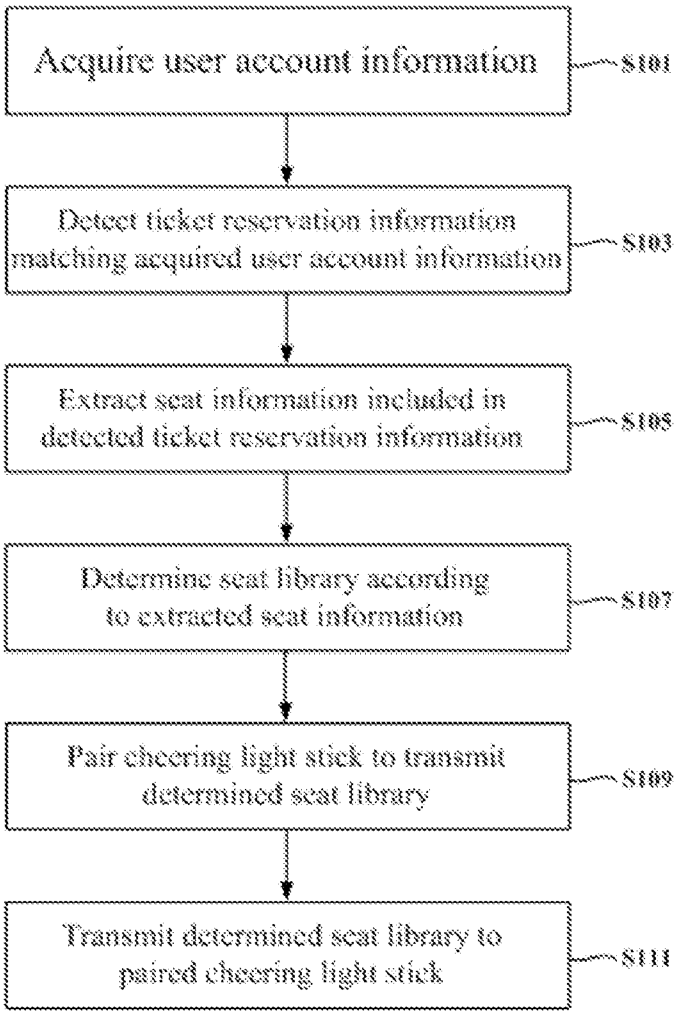
FIG. 9 is a detailed flowchart explaining a method of providing, by a processor assembly, a seat library to a cheering light stick according to an embodiment of the present invention.

FIG. 9 is a detailed flowchart for explaining a method of providing, by a processor assembly, a seat library to a cheering light stick according to an embodiment of the present invention.

Referring to FIG. 9, the kiosk 100 may acquire user account information through the account tag module 120 (S101).

In an embodiment, the processor assembly 160 may receive the user account information acquired by the account tag module 120 sensing and recognizing the tagging of the account authentication device 300 of a user.

In detail, the processor assembly 160 may perform short-distance communication with the account authentication device 300 of a user tagged with the account tag module 120 of the kiosk 100 and acquire user account information pre-stored in the tagged account authentication device 300.

To this end, a user may bring the account authentication device 300 corresponding to the performance that the user wants to watch to the account tag module 120 of the kiosk 100.

In this embodiment, the processor assembly 160 may control the display to output a screen guiding a recognition location of the account authentication device 300 to perform normal short-distance communication.

In addition, the account tag module 120 may recognize the account authentication device 300 proximate to the account tag module 120 based on the NFC function.

Accordingly, the account tag module 120 may receive user account information from the recognized account authentication device 300.

In addition, the kiosk 100 may acquire user account information by sensing a ticket possessed by a user.

In detail, the processor assembly 160 may sense a ticket possessed by a user using the image sensor 141 and perform optical character recognition (OCR) on the sensed ticket to acquire user account information.

Optical Character Recognition (OCR) refers to a method to acquire images of characters written by humans or machine-printed with an image scanner and to convert the same into machine-readable characters.

In another embodiment, the processor assembly 160 may control to capture a ticket possessed by a user by using the image sensor 141 included in the kiosk 100.

Subsequently, the processor assembly 160 may acquire a ticket image TI, which is an image capturing a ticket possessed by a user.

Figure 10:
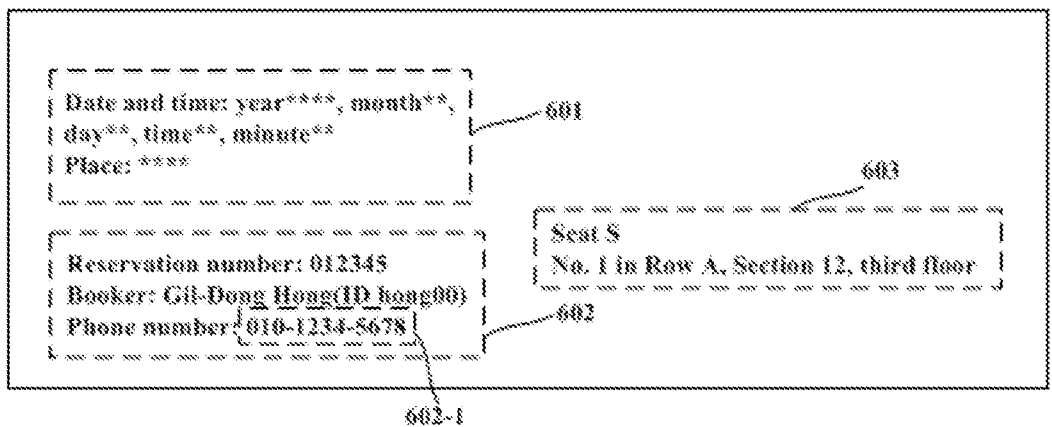
FIG. 10 is an example of a ticket image TI according to an embodiment of the present invention.

FIG. 10 is an example of a ticket image TI according to an embodiment of the present invention.

Referring to FIG. 10, the processor assembly 160 may detect at least one or more object areas 601 to 603 in the acquired ticket image TI.

In an embodiment of the present invention, the object areas 601 to 603 include predetermined texts. For example, the object areas 601 to 603 are divided into a first object area 601 including date and time and place information, a second object area 602 including user account information, and a third object area 603 including seat information for explanation.

In addition, the processor assembly 160 may set a target image among the detected object areas 601 to 603. In the embodiment, the target image means an image to be subjected to optical character recognition (OCR).

In detail, since the information to be acquired is user account information, the processor assembly 160 may set the second object area 602 including the user account information on the ticket image TI as a target image.

In addition, the processor assembly 160 may extract text included in the set target image.

Referring to FIG. 10, as an example, the processor assembly 160 may extract the texts "reservation number: 012345", "booker: Gil-Dong Hong (ID: hong00)" and "phone number: 010-1234-5678."

In other words, the processor assembly 160 may acquire user account information including the plurality of extracted texts by extracting the text included in the set target image.

In this embodiment the processor assembly 160 may find a specific character among the extracted entire text and use a predetermined letter extraction function (FIND, LEFT, MID, RIGHT, etc.) for extracting the desired text to re-extract predetermined information included in the user account information.

Referring back to FIG. 10, for example, when a mobile phone number of a user included in user account information is to be re-extracted, the processor assembly 160 may use a predetermined letter extraction function to acquire the mobile phone number of the user "010-1234-5678" (602-1).

In other words, the processor assembly 160 may acquire user account information by performing an optical character recognition process on the acquired ticket image TI to extract text from the ticket image TI.

In addition, the processor assembly 160 may simultaneously acquire user account information and ticket reservation information by performing optical character recognition (OCR) on the acquired ticket image TI, in which case S103 to be described later may be omitted and the next phase may be performed.

In another embodiment, the processor assembly 160 may acquire user account information based on a manual input of a user.

To this end, the processor assembly 160 may perform a search process for searching for information identical to the service ID and mobile phone number input by a user.

Referring back to FIG. 9, in an embodiment, the processor assembly 160 may detect ticket reservation information corresponding to the acquired user account information (S103).

In an embodiment, based on the performance management server 500, the processor assembly 160 of the kiosk 100 operated online may detect ticket reservation information corresponding to the acquired user account information by communicating with an external server (e.g., a ticket sales server). In this embodiment, there may be plural ticket reservation information as the user reserved number of seats with the same account, and information on ticket reservation information corresponding to each performance may be further included.

To this end, the processor assembly 160 may interwork with an external server (e.g., a ticket sales server) to detect ticket reservation information corresponding to user account information and a performance to be held within a predetermined time at a performance hall where the kiosk 100 is installed.

In other words, the processor assembly 160 of the kiosk 100 operated online may protect the personal information of a user and at the same time reduce the amount of data to be stored on the memory 150 by detecting the only ticket reservation information corresponding to the user account information by interworking with other servers.

In another embodiment, the processor assembly 160 of the kiosk 100 operated offline may detect user account information acquired from on the memory 150 and ticket reservation information corresponding to a performance to be held within a predetermined time at a performance hall where the kiosk 100 is installed.

In addition, in another embodiment, the processor assembly 160 may detect ticket reservation information corresponding to the user account information among a plurality of pieces of ticket reservation information pre-stored on the memory 150.

For example, the processor assembly 160 may execute a search process to detect ticket reservation information corresponding to user account information from a list including a plurality of pieces of ticket reservation information.

In other words, the processor assembly 160 of the kiosk 100 operated an offline may reduce the time and cost required for server connection by detecting only ticket reservation information corresponding to the user account information from the plurality of the pre-stored ticket reservation information.

Next, the processor assembly 160 may extract seat information included in the detected ticket reservation information (S105)

The extracted seat information may be plural according to the number of ticket reservations reserved by a user with the same account.

When a user has reserved a plurality of seats for the same performance with the same ticket site ID, the processor assembly 160 may output the detected plurality ticket reservation information to the touch screen.

For example, the processor assembly 160 may provide a ticket list including a plurality of detected ticket reservation information through a display.

In this embodiment, the processor assembly 160 may output the date and time of a performance, a ticket reservation number, and seat information to the touch screen so that a user may select one ticket reservation information from the plurality of ticket reservation information.

Subsequently, a user may touch one ticket reservation information among the plural ticket lists output on the touch screen, and the processor assembly 160 may select the corresponding ticket reservation information by receiving a user's touch input.

In addition, the processor assembly 160 may determine a seat library to be transmitted to the cheering light stick 200 according to seat information included in the selected ticket reservation information.

Subsequently, the processor assembly 160 may determine a seat library according to the extracted seat information (S107).

In detail, the processor assembly 160 may determine a seat library according to seat information of ticket reservation information.

In this embodiment, each of a plurality of seat libraries may be mapped to seat information and pre-stored on the memory 150 or the database 530.

In this embodiment, the processor assembly 160 may compare seat information of the ticket reservation information with seat information of a plurality of seat libraries pre-stored on the memory 150 or the database 530 by the performance management server 500.

In addition, the processor assembly 160 may detect one seat library corresponding to seat information among a plurality of seat libraries and determine the detected seat library to be transmitted in the next phase.

In addition, the processor assembly 160 may output seat information (e.g., a seat number) of the determined seat library and a guide related to pairing of the cheering light stick 200 with the kiosk 100 to the display of the kiosk 100 to inform a user of the selected seat and perform normal pairing.

Next, the processor assembly 160 may pair the cheering light stick 200 to transmit the determined seat library (S109).

In detail, the processor assembly 160 may perform pairing to perform short-distance communication based on the cheering light stick pairing module 130 of the kiosk 100 and the short-distance communication portion 210 of the cheering light stick 200 to transmit the determined seat library to the cheering light stick 200.

To this end, a user may bring the cheering light stick 200 corresponding to the performance and a seat to be viewed to make a contact with and/or to bring to the proximity of the cheering light stick pairing module 130 of the kiosk 100.

In this embodiment, the processor assembly 160 may output a screen for guiding the mounting position and the mounting duration of the cheering light stick 200 to the touch screen for normal pairing.

Accordingly, the processor assembly 160 may associate the cheering light stick 200 in contact with and/or proximate to the cheering light stick pairing module 130 with the kiosk 100 through Bluetooth communication.

Subsequently, the processor assembly 160 may transmit the determined seat library to the paired cheering light stick 200 (S111).

Since the kiosk 100 and the cheering light stick 200 transmit and receive a seat library through short-distance communication for the determined seat library to be transmitted to the paired cheering light stick 200, a guide informing that the cheering light stick 200 is required to keep contact with and proximity with the kiosk 100 may be displayed on the touch screen.

In addition, when the transmission is completed, the processor assembly 160 may output a predetermined alarm sound based on an audio sensor, operate the first and second LED modules 120-1 and 130-1, or open the cover 132 of the kiosk to inform a user that the transfer of the seat library is completed.

In other words, the processor assembly 160 according to an embodiment may acquire seat information of a user without the user's direct inputting of a seat number, and transmit only the seat library corresponding to the user's seat to the paired cheering light stick 200, such that minimizing errors due to collisions with seat libraries of other performances may be achieved.

Method of Providing, by the User Terminal 100, a Device Management Service

Hereinafter, a method of providing a device management service by the cheering light stick management application 411 of the user terminal 400 executed by at least one or more processors of the user terminal 400 according to an embodiment of the present invention will be described in detail with reference to the accompanying FIGS. 11 to 13.

In an embodiment, the cheering light stick management application 411 according to an embodiment of the present invention is an application that provides a service for managing and controlling (hereinafter, device management service) at least one or more devices (e.g., the cheering light stick 200 and the account authentication device 300) carried by a user, and is distinguished from the applications included in the aforementioned kiosk 100, the cheering light stick 200, and the account authentication device 300, and may have a different control range.

In an embodiment of the present invention, at least one or more processors of the user terminal 400 may execute at least one or more cheering light stick management applications 411 stored on at least one or more memories 150 or may operate in a background state.

Hereinafter, the at least one or more processors operating to execute the instructions of the cheering light stick management application 411 to perform the method of providing the device management service described above will be briefly described as being performed by the cheering light stick management application 411.

Figure 11:
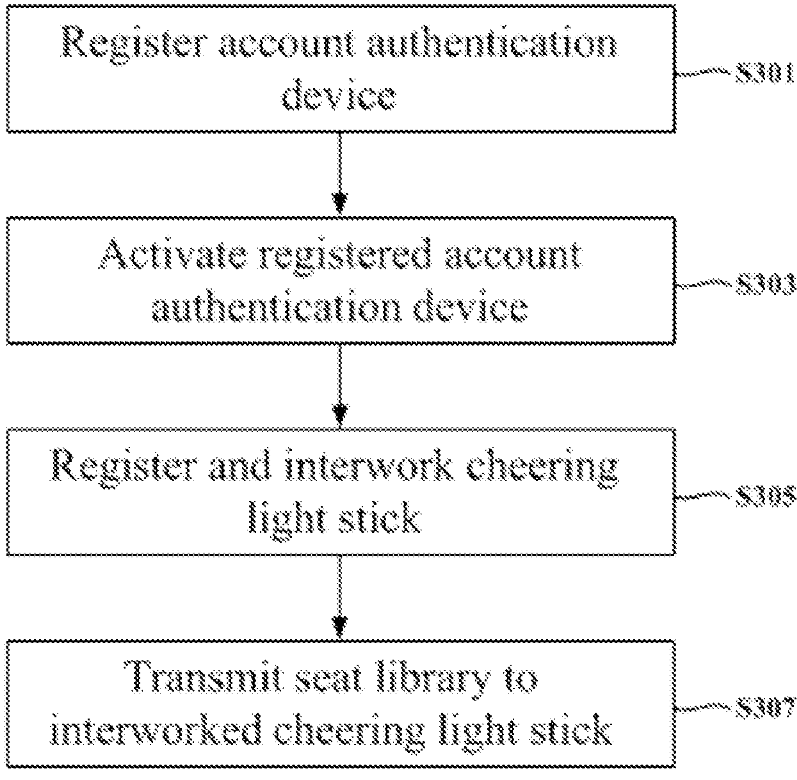
FIG. 11 is a flowchart explaining a method of transmitting, by a user terminal, a seat library to a cheering light stick according to an embodiment of the present invention.

FIG. 11 is a flowchart for explaining a method of transmitting, by a user terminal, a seat library to a cheering light stick according to an embodiment of the present invention.

Figure 12:
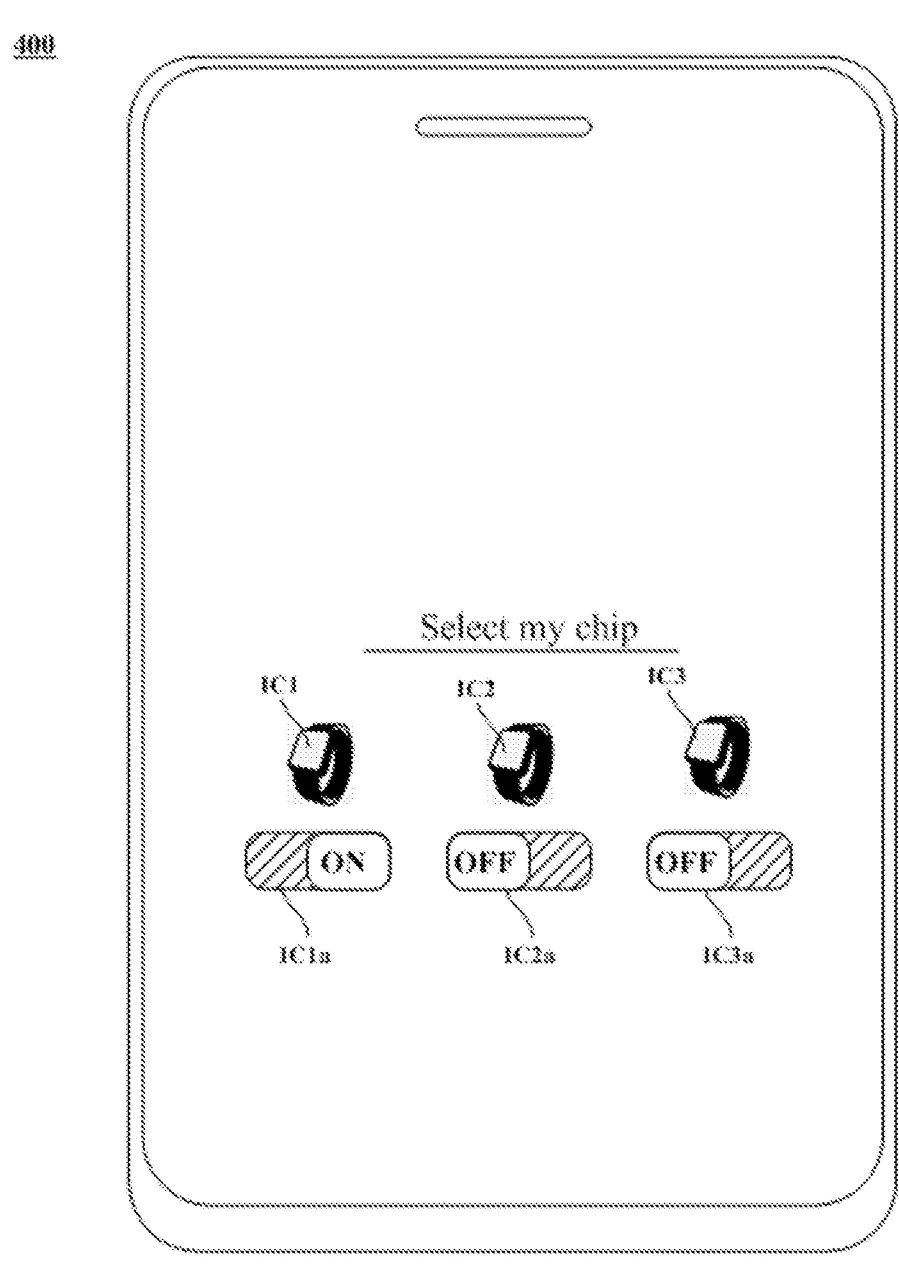
FIGS. 12 and 13 are examples showing an output screen of a pairing application of a user terminal according to an embodiment of the present invention.
Figure 13:
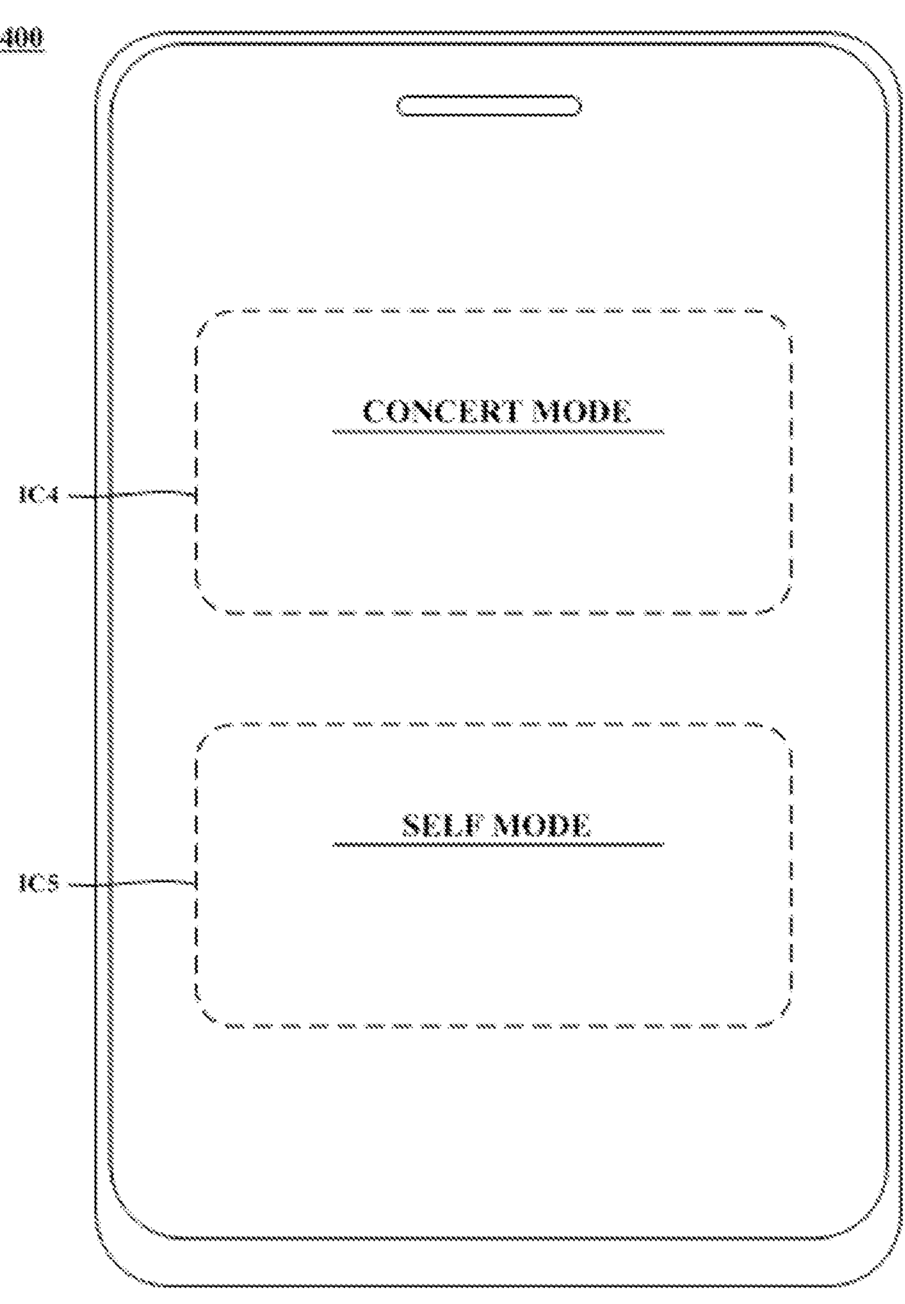

FIGS. 12 and 13 are examples showing an output screen of a cheering light stick management application of a user terminal according to an embodiment of the present invention.

In an embodiment, the cheering light stick management application 411 may register the account authentication device 300 in the user terminal 400 (S301).

In detail, the cheering light stick management application 411 may register the account authentication device 300 in the user terminal 400 through short-distance communication.

To this end, a user may contact and approach the account authentication device 300 and the user terminal 400.

In addition, the cheering light stick management application 411 may register each of a plurality of the account authentication devices 300 in the user terminal 400 when there are a plurality of account authentication devices 300 possessed by a user.

The user account information included in the plurality of account authentication devices 300 may be the same, and only the user-specific NFC ID set to each account authentication device 300 may be different.

In the above embodiment, the user terminal 400 is limited to a terminal that supports the NFC function. When the terminal does not support the NFC function or registration is impossible due to an operation error, the account authentication device 300 may be registered by providing a process for a user to manually input the user-specific NFC ID.

Next, the cheering light stick management application 411 may activate the account authentication device 300 to be used among the account authentication devices 300 registered in the user terminal 400 (S303).

When there is one registered account authentication device 300, the cheering light stick management application 411 may automatically activate the account authentication device 300.

On the other hand, when there are a plurality of registered account authentication devices 300, the cheering light stick management application 411 may display at least one or more account authentication devices 300 registered in the user terminal 400.

Referring to FIG. 12, the cheering light stick management application 411 may display at least one or more account authentication device icons IC1 to IC3 according to the number of at least one or more account authentication devices 300 registered in the user terminal 400.

In addition, a user may determine one account authentication device 300 required for watching a corresponding performance according to a desired artist and performance date and time.

Subsequently, a user may perform a touch input to determine the determined account authentication device 300 through on the user interface, and accordingly, the cheering light stick management application 411 may activate the account authentication device 300 to be used.

In an embodiment, the cheering light stick management application 411 may display at least one or more activation buttons IC1*a* to IC3*a* to activate the account authentication device 300 via the touch input of a user.

These activation buttons IC1*a* to IC3*a* may be displayed at the bottom of the account authentication device icons IC1 to IC3, and their shapes may be appeared differently depending on an activation state.

For example, the shape of the first activation button IC1*a* shown in FIG. 12 indicates that the account authentication device 300 corresponding to the account authentication device icon IC1 is in an activated state. The shapes of the second and third activation buttons IC2*a* and IC3*a* may indicate that the account authentication device 300 corresponding to the account authentication device icons IC2 and IC3 is in an inactivated state.

A user may perform a touch input by touching these activation buttons IC1*a* to IC3*a*, and accordingly the cheering light stick management application 411 may associate the user terminal 400 with the account authentication device 300 that the user wants to use by activating the account authentication device 300 to be used.

In an embodiment, a user may also activate the account authentication devices 300 corresponding to each performance and ticket reservation number, respectively, based on the cheering light stick management application 411.

To this end, the cheering light stick management application 411 may associate performances and ticket reservation numbers with each account authentication device 300 when the account authentication device 300 is registered.

For example, the cheering light stick management application 411 may display a list including at least one or more performances purchased by a user to the display.

In addition, when a user selects one performance included in the list, the cheering light stick management application 411 may automatically activate one account authentication device 300 previously matched with the corresponding performance among at least one or more account authentication devices 300 registered in the user terminal 400.

Similarly, for example, the cheering light stick management application 411 may display a list including at least one or more ticket reservation numbers purchased by a user to the display.

In addition, when a user selects one ticket reservation number included in the list, the cheering light stick management application 411 may automatically activate the account authentication device 300 previously matched with the corresponding ticket reservation number among at least one or more account authentication devices 300 registered in the user terminal 400.

In addition, the cheering light stick management application 411 may register the cheering light stick 200 to work with the user terminal 400 (S305).

In detail, the cheering light stick management application 411 may register the cheering light stick 200 to work with the user terminal 400 through short-distance communication. The method to perform short-distance communication are the same as the contents of S301 and S303 described above, and thus the method thereof will be applied without a detailed description.

The cheering light stick 200 registered in the user terminal 400 may be one cheering light stick 200 corresponding to a performance that a user wants to watch among at least one or more cheering light sticks 200 possessed by the user.

In addition, the cheering light stick management application 411 may transmit a seat library to the associated cheering light stick 200 (S307).

To this end, the cheering light stick management application 411 may acquire user account information based on information included in the registered account authentication device 300 and information that a user put in when a user logs in and/or signs up the cheering light stick management application 411.

In addition, the cheering light stick management application 411 may detect ticket reservation information corresponding to the user account information acquired by communication with an external server (e.g., a ticket sales server).

The cheering light stick management application 411 may may acquire ticket reservation information based on the user's manual input when the use is not a member.

In addition, the cheering light stick management application 411 may determine a seat library based on the detected ticket reservation information.

In this embodiment, the cheering light stick management application 411 may display a plurality of detected ticket reservation information on the user terminal 400 when a user has reserved a plurality of seats for the same performance with the same service ID.

A user may select one ticket reservation information among a plurality of ticket reservation information displayed on the user terminal 400, and the cheering light stick management application 411 may determine the seat library based on the seat information included in the selected ticket reservation information.

Accordingly, the cheering light stick management application 411 may transmit the determined seat library to the registered and associated cheering light stick 200.

In addition, a user may register at least one or more cheering light sticks 200 on the user terminal 400 and associate them with one of user account information, or reserve at least one or more tickets.

Accordingly, the cheering light stick management application 411 may register at least one or more cheering light sticks 200 and a ticket reservation number per one user account information and may manage each of the registered cheering light stick 200 and ticket reservation number.

In detail, for example, the cheering light stick management application 411 may activate the cheering light stick 200 to be used among the cheering light sticks 200 registered in the user terminal 400 or manage each of the registered cheering light sticks 200, such as checking the library seat registered in the cheering light stick 200.

In other words, since the cheering light stick management application 411 of the user terminal 400 according to an embodiment may transmit the seat library to the cheering light stick 200 by itself, even when the kiosk 100 may not be used due to user congestion, long waiting time, device failure, etc., or when a user watch an un-tact performance, self-pairing at a performance hall or at home is attainable, which gives a benefit of reducing the constraint of space and time in the pairing process.

In addition, the cheering light stick management application 411 may check whether the seat library of the cheering light stick 200 is stored through short-distance communication.

In addition, the cheering light stick management application 411 on the user terminal 400 may control the light emission of the cheering light stick 200.

In detail, the cheering light stick management application 411 may control the light emission of the cheering light stick 200 on the user terminal 400 by setting a predetermined mode.

To this end, the cheering light stick management application 411 may display at least one or more mode selection buttons IC4 and IC5 for setting the user terminal 400 a predetermined mode as shown in FIG. 13.

In addition, a user may perform a touch input for setting the predetermined mode through the user interface.

For example, referring to FIG. 13, when a user selects "a performance mode" by touching the first mode selection button IC4, the cheering light stick management application 411 may transmit the seat library required for the performance to be watched to the cheering light stick 200.

In addition, in the case of "a performance mode," which is a mode performing pairing at a performance hall, information related to the location of the pairing kiosk 100 may be provided.

In addition, referring back to FIG. 13, when a user selects "a self-mode" by touching the second mode selection button IC5, the cheering light stick management application 411 may provide a light emitting setup process in which a user may directly set light emitting basic data.

Accordingly, a user may set the properties of the light output from a light emitting device of the cheering light stick 200, such as the frequency of repeating light emission from the associated cheering light stick 200, flickering, and the color and brightness of the light from the cheering light stick 200.

Accordingly, through the cheering light stick management application 411 according to an embodiment, a user may use the self-mode to arbitrarily control the light emitting color of the cheering light stick 200 before the start of a performance or at a place other than a performance hall, which increases the use efficiency of the cheering light stick 200.

In addition, the cheering light stick management application 411 may receive a light emitting control signal and control message transmitted in a broadcasting manner, and operate the seat library stored in the associated cheering light stick 200, which makes a director and/or a user enable to control the light emission of the cheering light stick 200.

As described above, since the seat library pairing method and system using short-distance wireless communication according to an embodiment of the present invention has the benefit in that a plurality of cheering light sticks can be controlled through a seat library stored in advance, the plurality of cheering light sticks simultaneously perform a unified performance direction.

In addition, since the seat library pairing method and system using short-distance wireless communication according to an embodiment of the present invention stores a seat library for the corresponding performance, minimizing errors due to collision with the seat library of other performances may be achieved.

In addition, since the seat library pairing method and system using short-distance wireless communication according to an embodiment of the present invention enables the pairing of a cheering light stick and a kiosk through an intuitive user experience, reducing the time and inconvenience required for storing a seat library and increasing the convenience of a user may be achieved.

In addition, since the seat library pairing method and system using short-distance wireless communication according to an embodiment of the present invention enables the transmission of the seat library to the cheering light stick by itself on the user terminal, even when the kiosk may not be used due to user congestion, long waiting time, device failure, etc., or when a user watches an un-tact performance, self-pairing at a performance hall or at home is attainable, which gives a benefit of reducing the constraint of space and time in the pairing process.

The method according to the example embodiments of the present invention described above may be implemented through program instructions executable through various components on a computer, and such computer programs may be recorded in computer-readable recording media. The computer-readable recording media may include, alone or in combination with the program instructions, data files, data structures, and the like. The program instructions recorded on the computer readable recording media may be those specially designed and constructed for the purposes of the present invention or they may be of the kind well known and available to those skilled in the computer software arts. Examples of the computer-readable recording media include magnetic media such as hard disks, floppy disks, and magnetic tape; optical media such as CD-ROM disks and DVD-ROM disks; magneto-optical media such as floptical disks; and hardware devices that are specially configured to store and execute program instructions, such as ROM, RAM, flash memory, and the like. Examples of program instructions may include both machine codes, such as produced by a compiler, and higher-level codes that may be executed by the computer using an interpreter. A hardware device may be converted into one or more software modules to perform processing in accordance with an embodiment of the present invention, and vice versa.

The particular implementations shown and described herein are illustrative examples and are not intended to otherwise limit the scope of the present invention in any way. For the sake of brevity of the specification, the descriptions of conventional electronics, control systems, software and other functional aspects of the systems may be omitted. Furthermore, connecting lines or connection members between the components shown in the drawings are intended to represent exemplary functional connections and/or physical or logical connections. It should be noted that many alternative or additional functional connections, physical connections or logical connections may be present in a practical device. Moreover, no component is essential to the application of the present invention unless the element is specifically described as "essential" or "critical."

As described above, the present invention has been described in the detailed description with reference to preferred embodiments of the present invention. However, those having ordinary skill in the art or common knowledge in the art will appreciate that various modifications and variations may be possible in the present invention without departing from the spirit and technical scope of the present invention described in the following claims. Accordingly, the technical scope of the present invention is duly not limited to the contents described in the specification but should be defined by the appended claims.

What is claimed is:

1. A seat library pairing method using short-distance wireless communication, the method performing, by an application executed by at least one processor of a kiosk, a seat library pairing service using the short-distance wireless communication, and including:

detecting ticket reservation information;

extracting seat information including a position of a seat at a performance hall from the detected ticket reservation information;

determining a seat library matching the extracted seat information;

controlling to pair a cheering light stick to store the determined seat library; and controlling to transmit the seat library to the paired cheering light stick, wherein the detecting of the ticket reservation information includes, acquiring user account information from an account authentication device; and detecting the ticket reservation information matching the acquired user account information, wherein the acquiring of the user account information from the account authentication device further includes, recognizing the account authentication device tagged to an NFC account tag module that includes a first short-distance communication processor for sensing a tagged device; and reading the user account information through NFC communication from the recognized account authentication device, wherein the detecting of the ticket reservation information matching the acquired user account information includes, communicating with a performance management server;

detecting ticket reservation information matched to the acquired user account information among at least one or more pieces of ticket reservation information stored in a database of the performance management server; and receiving the detected ticket reservation information from the performance management server, wherein the determining a seat library matching the extracted seat information includes, outputting, to a display of the kiosk, (i) seat information of the determined seat library to inform a user of the selected seat, and (ii) a guide related to pairing of a cheering light stick, and when the kiosk is unavailable or congested, performing self-pairing using a cheering light stick management application stored on a memory of a terminal of the user, wherein the self-pairing includes pairing at the performance hall or at a home which reduces the constraint of space and time in the pairing process.

2. The method of claim 1, wherein the detecting of the ticket reservation information includes:

acquiring a ticket image by capturing a ticket based on an image sensor;

performing optical character recognition (OCR) on the acquired ticket image; and extracting a predetermined text included in the ticket image.

3. The method of claim 1, wherein the user account information comprises at least one information from a plurality of information including a user's name, a date of birth, a mobile phone number, an e-mail address, and a platform ID; and wherein the ticket reservation information comprises at least one information from a plurality of information including a name of a person who purchased a ticket, a date of birth of the person, a ticket website ID of the person, a mobile phone number of the person, a performance name, a performance date and time, a performance place, a reservation number, a number of tickets reserved, and seat information.

4. The method of claim 1, wherein the extracting the seat information included in the detected ticket reservation information further comprises:

when a plurality of ticket reservation information are detected, determining one ticket reservation information by the user; and extracting seat information from the user-selected ticket reservation information.

5. The method of claim 1, wherein the determining the seat library corresponding to the extracted seat information comprises:

storing a plurality of seat libraries corresponding to performance preparation data for each seat information;

comparing the extracted seat information with the seat information of the plurality of seat libraries; and determining a first seat library corresponding to the extracted seat information among the plurality of seat libraries.

6. The method of claim 5, wherein the performance preparation data comprises at least one of light emitting pattern, library data, and a scenario.

7. The method of claim 6, wherein the library data comprises an identification code for identifying each library and a light emitting pattern set value that is a preset value for constituents of the light emitting pattern; and wherein the scenario comprises an identification code for identifying each scenario and a library set value that is a preset value for an operation time of the library data.

8. The method of claim 5, wherein, in the plurality of seat libraries, the identification code for identifying the library and the identification code for identifying the scenario are the same, and the light emitting pattern set value and the library set value are defined differently for each seat information.

9. The method of claim 1, wherein the pairing of the cheering light stick to store the seat library includes performing short-distance communication between the kiosk and the cheering light stick adjacent to a cheering light stick pairing module through a short-range wireless communication, and wherein the cheering light stick pairing module includes a second short-distance communication processor for sensing a tagged device.

10. The method of claim 1, wherein the selecting the ticket reservation information corresponding to the acquired user account information further comprises:

detecting the ticket reservation information corresponding to the acquired user account information among the at least one or more ticket reservation information stored on the memory of the kiosk; and reading the detected ticket reservation information from the memory of the kiosk, wherein the kiosk operates both in online for a communication with the performance management server and in offline for reading information stored on the memory of the kiosk.

11. A seat library pairing system using short-distance wireless communication comprising:

a kiosk comprising at least one display for displaying a content of a library pairing service, at least one memory, at least one processor, and at least one application stored on the memory of the kiosk and executed by the processor to provide the library pairing service, wherein the application of the kiosk is configured to:

detect ticket reservation information;

extract seat information including a position of a seat at a performance hall from the detected ticket reservation information;

determine a seat library corresponding to the extracted seat information;

pair the kiosk with a cheering light stick to store the determined seat library; and transmit the seat library to the paired cheering light stick, wherein the detecting of the ticket reservation information includes, acquiring user account information from an account authentication device; and detecting the ticket reservation information matching the acquired user account information, wherein the acquiring of the user account information from the account authentication device further includes, recognizing the account authentication device tagged to an NFC account tag module that includes a first short-distance communication processor for sensing a tagged device; and reading the user account information through NFC communication from the recognized account authentication device, wherein the detecting of the ticket reservation information matching the acquired user account information includes, communicating with a performance management server;

detecting ticket reservation information matched to the acquired user account information among at least one or more pieces of ticket reservation information stored in a database of the performance management server; and receiving the detected ticket reservation information from the performance management server, wherein the determining a seat library matching the extracted seat information includes, outputting, to a display of the kiosk, (i) seat information of the determined seat library to inform a user of the selected seat, and (ii) a guide related to pairing of a cheering light stick, and when the kiosk is unavailable or congested, performing self-pairing using a cheering light stick management application stored in a memory of a terminal of the user, wherein the self-pairing includes pairing at the performance hall or at a home which reduces the constraint of space and time in the pairing process.

* * * * *